US012771174B1

(12) United States Patent
Li et al.

(10) Patent No.: US 12,771,174 B1
(45) **Date of Patent: *Oct. 20, 2026**

(54) MAGNETICS CONFIGURATIONS FOR WIRELESS POWER TRANSFER AND COMMUNICATIONS IN ELECTRONIC DEVICE

(71) Applicant: Apple Inc., Cupertino, CA (US)

(72) Inventors: Ye Li, Sunnyvale, CA (US); Saining Ren, Auckland (NZ); Eric X Zhou, San Jose, CA (US); Makiko K Brzezinski, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1240 days.

This patent is subject to a terminal disclaimer.

(21) Appl. No.: 17/652,834

(22) Filed: Feb. 28, 2022

Related U.S. Application Data

(60) Provisional application No. 63/167,811, filed on Mar. 30, 2021, provisional application No. 63/167,813,
(Continued)

(51) Int. Cl.
*H02J 50/10* (2016.01)
*H02J 7/42* (2026.01)
(Continued)

(52) U.S. Cl.
CPC ................ *H02J 50/10* (2016.02); *H02J 7/42* (2026.01); *H02J 50/80* (2016.02); *H02J 50/90* (2016.02); *H04B 5/266* (2024.01); *H04B 5/79* (2024.01)

(58) Field of Classification Search
CPC .............. A61B 1/0029; A61M 60/873; A61M 2205/8234; A61N 1/3787; B60C 23/0413;
(Continued)

(56) References Cited

U.S. PATENT DOCUMENTS 9,172,437 B2 * 10/2015 Tilvis ...................... H02J 50/10
9,409,490 B2 8/2016 Kawashima
(Continued)

FOREIGN PATENT DOCUMENTS

JP H08236339 A 9/1996

OTHER PUBLICATIONS

Office Action for U.S. Appl. No. 17/652,829 dated Oct. 30, 2024; 15 pgs.
(Continued)

*Primary Examiner* — Drew A Dunn
*Assistant Examiner* — Frank Alexis Silva
(74) *Attorney, Agent, or Firm* — FLETCHER YODER PC

(57) ABSTRACT

A device can include a wireless power transfer coil configured to be magnetically coupled to a wireless power transfer coil of a complementary device, wireless power transfer circuitry, a processing and communications system powered by the battery, and a wireless communications coil coupled to the processing and communications system, the communications coil comprising one or more windings configured to be magnetically coupled to a Double-D communications coil of the complementary device to allow communications between the processing and communications system and the complementary device, wherein the one or more windings of the communications coil can be disposed in at least one plane parallel to an axis of symmetry of the Double-D communications coil.

16 Claims, 15 Drawing Sheets

Related U.S. Application Data filed on Mar. 30, 2021, provisional application No. 63/167,804, filed on Mar. 30, 2021.

(51) Int. Cl.

*H02J 50/80* (2016.01)
*H02J 50/90* (2016.01)
*H04B 5/26* (2024.01)
*H04B 5/79* (2024.01)

(58) Field of Classification Search

CPC ................ B60L 11/182; B60L 11/1829; B60L 11/1831; B60L 53/34; B60L 53/38; B60L 53/39; B60L 2230/14; H01F 27/24; H01F 27/28; H01F 38/14; H02J 7/025; H02J 50/00; H02J 50/05; H02J 50/10; H02J 50/12; H02J 50/15; H02J 50/20; H02J 50/23; H02J 50/27; H02J 50/30; H02J 50/40; H02J 50/50; H02J 50/60; H02J 50/70; H02J 50/80; H02J 50/90; H02J 5/00; H02J 7/00034; H02J 7/0044; H02J 17/00; H02J 50/005; H04B 5/00; H04B 5/0025; H04B 5/0037; H04B 5/0075; H04B 5/0081; H04B 5/0087; H04B 5/0093; H04B 5/26; H04B 5/29; H04B 5/72; Y02T 90/122

USPC ............................................ 320/108; 191/10

See application file for complete search history.

(56) References Cited

U.S. PATENT DOCUMENTS 9,413,191 B2 * 8/2016 Kim ..................... H04B 1/3833
9,461,479 B2 * 10/2016 Chae ....................... H02J 50/10
9,577,449 B2 2/2017 Hoover
9,590,449 B2 * 3/2017 Tilvis ....................... H04B 7/26
9,653,942 B2 * 5/2017 Kim ......................... H01Q 1/38
9,735,605 B2 * 8/2017 Garcia Briz .............. H02J 7/04
9,769,558 B2 * 9/2017 Chandramohan .... H01R 13/521
9,831,685 B2 * 11/2017 Han ......................... H04B 5/26
9,859,052 B2 * 1/2018 Kurz ................... H01F 27/2852
9,935,481 B2 * 4/2018 Yamaguchi ........... H02J 50/005
9,941,576 B2 * 4/2018 Ito ........................ H01Q 21/28
9,941,706 B2 * 4/2018 Laudebat .............. H02J 7/0029
9,961,431 B2 * 5/2018 McPeak ................... H04R 9/06
9,961,433 B2 * 5/2018 Chawan ................. B65D 25/02
9,967,644 B2 * 5/2018 Chawan ............... H04R 1/1075
9,967,648 B2 * 5/2018 Panecki .................. H02J 50/10
9,967,649 B2 * 5/2018 Chandramohan ...... H04R 1/345
9,967,650 B2 * 5/2018 Chawan ................... H04B 5/79
9,973,840 B2 * 5/2018 Wagman ................ A45C 11/24
9,973,845 B2 * 5/2018 Chawan .................. H02J 50/10
9,991,735 B1 * 6/2018 Yamaguchi ............. H01F 38/14
9,991,744 B2 * 6/2018 Lee .......................... H04B 5/79
9,997,952 B2 * 6/2018 Yamaguchi ............ H01Q 1/521
10,000,134 B2 * 6/2018 Zhang ..................... B60L 53/66
10,003,217 B2 6/2018 Kuerschner et al.
10,003,880 B2 * 6/2018 Wagman .............. H04R 1/1016
10,003,881 B2 * 6/2018 Cousins ............... H04R 1/1016
10,020,673 B2 * 7/2018 Yamaguchi ........... H02J 50/005
10,050,478 B2 * 8/2018 Kim ......................... H01Q 7/06
10,097,913 B2 * 10/2018 Zörkendörfer ..... A45C 13/1069
10,141,783 B2 11/2018 Ogawa et al.
10,144,302 B2 12/2018 Samuelsson et al.
10,148,117 B2 12/2018 Lethellier et al.
10,200,087 B2 * 2/2019 Penttila .................... H04B 5/79
10,284,023 B2 * 5/2019 Kim ...................... H01F 27/245
10,332,663 B2 * 6/2019 Cho ........................ H02J 50/70
10,336,197 B2 7/2019 Kotani et al.
10,340,078 B2 7/2019 Widmer et al.
10,341,787 B2 * 7/2019 Blum ................... H04R 25/554
10,354,794 B2 7/2019 Budhia et al.
10,358,045 B2 7/2019 Budhia et al.
10,361,591 B2 7/2019 Widmer et al.
10,374,460 B2 8/2019 Oshima et al.
10,377,254 B2 8/2019 Niizuma
10,397,682 B2 * 8/2019 Chawan ................. B65D 25/02
10,397,683 B2 * 8/2019 LeBlanc .............. H01R 13/521
10,399,448 B2 9/2019 Seong et al.
10,404,100 B2 9/2019 Werner
10,446,316 B2 10/2019 Furiya et al.
10,491,049 B2 * 11/2019 Kim .................... H01F 27/2828
10,566,839 B2 2/2020 Widmer et al.
10,574,082 B2 2/2020 Yamaguchi et al.
10,593,468 B2 * 3/2020 Chen ....................... H01F 38/14
10,594,160 B2 * 3/2020 Jain ......................... H02J 50/10
10,608,441 B2 3/2020 Tillotson et al.
10,681,446 B2 * 6/2020 Chawan ............. A45C 13/1069
10,789,792 B2 * 9/2020 Grange ................... G06F 21/86
10,880,630 B2 * 12/2020 Chawan ................... H04R 9/06
10,904,652 B2 * 1/2021 Chawan ................. B65D 25/02
10,944,298 B2 * 3/2021 Kim ........................ H01F 38/14
11,004,598 B2 * 5/2021 Kurz ........................ H01F 41/04
11,004,599 B2 * 5/2021 Kurz ................... H01F 27/2852
11,018,531 B2 * 5/2021 Kim ......................... H04B 5/72
11,018,532 B2 * 5/2021 Sankar .................... H02J 50/10
11,056,916 B2 * 7/2021 Leem ...................... H01F 38/14
11,070,075 B2 * 7/2021 Yamaguchi ............. H02J 50/12
11,146,121 B2 * 10/2021 Nakao ...................... H04B 5/79
11,152,151 B2 * 10/2021 Singh ...................... H01F 27/28
11,166,112 B2 * 11/2021 Blum ...................... H02J 50/12
11,179,559 B2 * 11/2021 Hansen ................ A61B 5/0031
11,239,698 B1 * 2/2022 Roe ....................... H02M 7/219
11,277,028 B2 * 3/2022 Luzinski ................. H02J 50/70
11,277,029 B2 * 3/2022 Luzinski .............. H02J 50/005
11,282,638 B2 * 3/2022 Luzinski ................. H02J 50/70
11,283,295 B2 * 3/2022 Luzinski .................. H04B 5/72
11,283,296 B2 * 3/2022 Luzinski ................ H04B 5/263
11,387,679 B2 * 7/2022 Teply .................... H02J 50/005
11,548,400 B2 * 1/2023 Laemmle ............. B60L 53/302
11,637,459 B2 * 4/2023 Alam ...................... H02J 50/80
307/149
11,652,511 B2 * 5/2023 Luzinski ............... H01F 27/363
336/200
11,705,746 B2 * 7/2023 Kim ...................... H02J 7/0042
320/108
11,831,171 B2 * 11/2023 Teply ...................... H01F 38/14
11,837,884 B2 * 12/2023 Bima ...................... H02J 50/12
11,881,726 B2 * 1/2024 Mohammad ............ H02J 50/90
12,040,562 B2 * 7/2024 Yamaguchi .............. H01Q 7/06
12,088,126 B2 * 9/2024 Nord ..................... H02J 50/402
12,142,418 B2 * 11/2024 Kurz ................... H01F 27/2852
12,272,968 B2 * 4/2025 Kim ........................ H02J 50/12
2005/0151696 A1 * 7/2005 Govari ..................... H01Q 5/42
343/788
2008/0116847 A1 * 5/2008 Loke ....................... H02J 50/10
320/108
2011/0248673 A1 * 10/2011 Aerts ...................... H02J 50/12
320/108
2013/0063084 A1 * 3/2013 Tilvis ...................... H02J 50/90
320/108
2013/0154383 A1 * 6/2013 Kasturi ................... H02J 50/12
307/104
2013/0307468 A1 * 11/2013 Lee ....................... H01F 27/366
320/108
2013/0328407 A1 * 12/2013 Shimura ................. H01F 38/14
307/104
2014/0168019 A1 6/2014 Hirobe
2014/0232197 A1 * 8/2014 Keeling .................... B60L 3/00
307/43
2014/0340032 A1 * 11/2014 Curtis ................. E05B 47/0001
320/108
2014/0347008 A1 * 11/2014 Chae ....................... H02J 50/12
320/108
2014/0354222 A1 * 12/2014 Park ........................ H01F 38/14
320/108
2014/0375262 A1 * 12/2014 Yamaguchi ............ H01Q 21/28
320/108
2015/0054455 A1 * 2/2015 Kim ........................ H02J 50/70
320/108

(56) References Cited

U.S. PATENT DOCUMENTS

| | | | | |
|---|---|---|---|---|
| 2015/0066155 | A1* | 3/2015 | Haque | A61F 2/38 623/24 |
| 2015/0094887 | A1* | 4/2015 | Kawashima | B60L 53/124 320/108 |
| 2015/0115727 | A1* | 4/2015 | Carobolante | H01F 38/14 307/104 |
| 2015/0130409 | A1* | 5/2015 | Lee | H02J 50/12 320/108 |
| 2015/0134029 | A1* | 5/2015 | Ozawa | A61N 1/37211 607/60 |
| 2015/0145634 | A1* | 5/2015 | Kurz | H01F 27/366 29/606 |
| 2015/0214752 | A1* | 7/2015 | Gluzman | H02J 50/12 307/104 |
| 2015/0255993 | A1* | 9/2015 | Kuerschner | B60L 53/126 307/104 |
| 2015/0280448 | A1* | 10/2015 | White, II | H01F 38/14 336/200 |
| 2015/0333532 | A1* | 11/2015 | Han | H01F 27/36 307/104 |
| 2015/0364929 | A1* | 12/2015 | Davis | H01F 38/14 307/104 |
| 2016/0001663 | A1* | 1/2016 | Chae | B60L 1/006 307/104 |
| 2016/0049827 | A1* | 2/2016 | Tilvis | H04B 5/79 320/108 |
| 2016/0056664 | A1* | 2/2016 | Partovi | B60L 53/122 307/104 |
| 2016/0072299 | A1* | 3/2016 | Huang | B60L 50/16 307/104 |
| 2016/0087447 | A1* | 3/2016 | Laudebat | H02J 50/10 307/104 |
| 2016/0104937 | A1* | 4/2016 | Kumura | H02J 50/80 343/788 |
| 2016/0111887 | A1* | 4/2016 | Jeong | H02J 50/12 320/108 |
| 2016/0118179 | A1* | 4/2016 | Park | H01F 38/14 320/108 |
| 2016/0118806 | A1* | 4/2016 | Standke | H02J 50/402 307/104 |
| 2016/0126639 | A1* | 5/2016 | Kim | H04W 4/80 307/104 |
| 2016/0141884 | A1* | 5/2016 | Lee | H02J 50/12 307/104 |
| 2016/0149432 | A1* | 5/2016 | Knepper | H02J 50/10 320/108 |
| 2016/0172890 | A1* | 6/2016 | Jeong | G04C 10/00 320/108 |
| 2016/0181852 | A1* | 6/2016 | Penttila | H04B 5/79 320/108 |
| 2016/0181858 | A1* | 6/2016 | Satyamoorthy | H02J 7/70 307/104 |
| 2016/0211702 | A1* | 7/2016 | Muratov | H01F 27/38 |
| 2016/0301241 | A1* | 10/2016 | Cho | H02J 50/10 |
| 2016/0365747 | A1* | 12/2016 | Redding | H01M 10/46 |
| 2016/0380467 | A1* | 12/2016 | Shao | H02J 50/80 320/108 |
| 2017/0005399 | A1* | 1/2017 | Ito | H01Q 1/38 |
| 2017/0005519 | A1* | 1/2017 | Lee | H04B 5/79 307/104 |
| 2017/0018953 | A1* | 1/2017 | Yamaguchi | H01Q 1/38 |
| 2017/0077754 | A1* | 3/2017 | Jeong | H01F 38/14 |
| 2017/0093079 | A1* | 3/2017 | Wagman | A45C 11/24 |
| 2017/0093216 | A1* | 3/2017 | Cho | H01F 38/14 |
| 2017/0093453 | A1* | 3/2017 | Panecki | H04R 1/2826 |
| 2017/0093454 | A1 | 3/2017 | Chawan | |
| 2017/0094381 | A1* | 3/2017 | LeBlanc | A45C 11/24 |
| 2017/0094390 | A1* | 3/2017 | Chawan | H04R 9/06 |
| 2017/0094391 | A1* | 3/2017 | Panecki | H04B 5/79 |
| 2017/0094392 | A1* | 3/2017 | Zörkendörfer | H04R 1/345 |
| 2017/0094393 | A1* | 3/2017 | Panecki | H04R 1/02 |
| 2017/0094394 | A1* | 3/2017 | McPeak | B65D 25/02 |
| 2017/0094395 | A1* | 3/2017 | McPeak | A45C 13/005 |
| 2017/0094396 | A1* | 3/2017 | Chandramohan | H04R 1/1041 |
| 2017/0094397 | A1* | 3/2017 | Wagman | H01R 13/521 |
| 2017/0094398 | A1* | 3/2017 | Cousins | H04R 9/025 |
| 2017/0094399 | A1* | 3/2017 | Chandramohan | H04R 1/02 |
| 2017/0179773 | A1* | 6/2017 | Kim | H04B 5/26 |
| 2017/0208158 | A1* | 7/2017 | Kim | H01F 27/2804 |
| 2017/0229900 | A1* | 8/2017 | Cho | H01F 38/14 |
| 2017/0237293 | A1* | 8/2017 | Faraone | H02J 50/80 713/300 |
| 2017/0238087 | A1* | 8/2017 | Chawan | H04R 9/025 381/380 |
| 2017/0245038 | A1* | 8/2017 | Chawan | H04R 1/2826 |
| 2017/0274788 | A1* | 9/2017 | Zhang | B60L 53/66 |
| 2017/0326992 | A1* | 11/2017 | Budhia | B60L 5/005 |
| 2017/0338029 | A1* | 11/2017 | Perez | H01F 27/2823 |
| 2017/0353046 | A1* | 12/2017 | Chen | H01F 38/14 |
| 2018/0034327 | A1* | 2/2018 | Ren | H01F 38/14 |
| 2018/0061563 | A1* | 3/2018 | Budhia | H01F 38/14 |
| 2018/0069421 | A1* | 3/2018 | Yamaguchi | H01Q 1/38 |
| 2018/0076650 | A1* | 3/2018 | Yamaguchi | H01Q 1/243 |
| 2018/0115816 | A1* | 4/2018 | Panecki | H04B 5/79 |
| 2018/0131242 | A1* | 5/2018 | Louis | H04B 5/24 |
| 2018/0131412 | A1* | 5/2018 | Wilson | H02J 50/10 |
| 2018/0137972 | A1* | 5/2018 | Widmer | B60L 53/122 |
| 2018/0159357 | A1* | 6/2018 | Yamaguchi | H01Q 1/521 |
| 2018/0159358 | A1* | 6/2018 | Yamaguchi | H02J 50/12 |
| 2018/0174745 | A1* | 6/2018 | Percebon | H01F 38/14 |
| 2018/0175656 | A1* | 6/2018 | Kelly | H04W 12/06 |
| 2018/0175671 | A1 | 6/2018 | Ren | |
| 2018/0198306 | A1* | 7/2018 | Findley | G06F 1/263 |
| 2018/0198318 | A1* | 7/2018 | Jain | H01F 41/041 |
| 2018/0211771 | A1* | 7/2018 | Kurz | H01F 27/2847 |
| 2018/0211772 | A1* | 7/2018 | Kurz | H01F 27/2847 |
| 2018/0233961 | A1 | 8/2018 | Hu | |
| 2018/0241242 | A1* | 8/2018 | Yamaguchi | H01Q 7/06 |
| 2018/0248417 | A1* | 8/2018 | Ichikawa | H02J 50/70 |
| 2018/0269714 | A1 | 9/2018 | Samuelsson et al. | |
| 2018/0331583 | A1* | 11/2018 | Kim | H04B 5/266 |
| 2018/0342900 | A1* | 11/2018 | Luzinski | H01F 27/2804 |
| 2018/0343038 | A1* | 11/2018 | Singh | H04B 5/72 |
| 2018/0343039 | A1* | 11/2018 | Luzinski | H02J 50/12 |
| 2018/0343040 | A1* | 11/2018 | Luzinski | H01F 38/14 |
| 2018/0343041 | A1* | 11/2018 | Luzinski | H01F 27/363 |
| 2018/0343042 | A1* | 11/2018 | Luzinski | H01F 38/14 |
| 2019/0044394 | A1* | 2/2019 | Hansen | A61N 1/3787 |
| 2019/0074719 | A1* | 3/2019 | Wittenberg | H01F 27/2823 |
| 2019/0123430 | A1* | 4/2019 | Heppell | A61N 1/37229 |
| 2019/0188938 | A1* | 6/2019 | Grange | H04B 5/79 |
| 2019/0207408 | A1* | 7/2019 | Knepper | H04B 5/26 |
| 2019/0207411 | A1* | 7/2019 | Kim | H01F 27/38 |
| 2019/0222072 | A1* | 7/2019 | Kim | H02J 50/80 |
| 2019/0289381 | A1* | 9/2019 | Chawan | H04R 1/02 |
| 2019/0289382 | A1* | 9/2019 | Chawan | A45C 13/02 |
| 2019/0289383 | A1* | 9/2019 | Chawan | H04B 5/79 |
| 2019/0311848 | A1* | 10/2019 | Chen | H01F 38/14 |
| 2019/0327567 | A1* | 10/2019 | Blum | H02J 50/12 |
| 2019/0334391 | A1* | 10/2019 | Qi | H01F 38/14 |
| 2019/0363565 | A1* | 11/2019 | Graham | H01F 27/2871 |
| 2019/0393730 | A1* | 12/2019 | Wittenberg | A61B 5/681 |
| 2019/0393733 | A1 | 12/2019 | Radchenko et al. | |
| 2020/0013549 | A1 | 1/2020 | Samuelsson | |
| 2020/0021144 | A1* | 1/2020 | Budhia | B60L 53/12 |
| 2020/0028385 | A1* | 1/2020 | Kim | H01Q 7/06 |
| 2020/0036229 | A1* | 1/2020 | Pinciuc | H01F 38/14 |
| 2020/0039368 | A1 | 2/2020 | Sieber et al. | |
| 2020/0044491 | A1* | 2/2020 | Qiu | H02J 50/10 |
| 2020/0059119 | A1* | 2/2020 | Maniktala | H02J 50/12 |
| 2020/0094700 | A1 | 3/2020 | Hui | |
| 2020/0169121 | A1* | 5/2020 | Keith | H02J 50/12 |
| 2020/0185969 | A1* | 6/2020 | Yamaguchi | H02J 50/005 |
| 2020/0195055 | A1* | 6/2020 | Hansen | A61M 60/178 |
| 2020/0266668 | A1* | 8/2020 | Yankowitz | H02J 50/70 |
| 2020/0274404 | A1* | 8/2020 | Sankar | H02J 7/00034 |
| 2020/0275184 | A1* | 8/2020 | Chawan | H04R 1/1041 |
| 2020/0288229 | A1* | 9/2020 | Chawan | H04R 1/345 |
| 2020/0321807 | A1* | 10/2020 | Ren | H02J 50/12 |
| 2020/0336019 | A1* | 10/2020 | Kim | H04B 5/266 |
| 2021/0066950 | A1* | 3/2021 | Cai | H01F 27/42 |

(56) References Cited

U.S. PATENT DOCUMENTS

2021/0091605 A1* 3/2021 Nakao .................... H02J 50/12
2021/0129694 A1* 5/2021 Laemmle ................ B60L 53/12
2021/0194290 A1* 6/2021 Mao ........................ B60L 53/12
2021/0234410 A1* 7/2021 Kim ........................ H04M 1/03
2021/0242720 A1* 8/2021 Cheikh .................... H04B 5/43
2021/0265108 A1* 8/2021 Kim ........................ H01F 38/14
2021/0265109 A1* 8/2021 Kurz ....................... H01F 38/14
2021/0313836 A1* 10/2021 Yamaguchi ............. H01F 38/14
2021/0320532 A1* 10/2021 Partovi ................... B60L 53/12
2021/0344227 A1* 11/2021 Kovacs ................. H02J 50/005
2021/0344228 A1* 11/2021 Alam ...................... H02J 50/70
2022/0038626 A1* 2/2022 Blum ...................... H02J 50/40
2022/0060836 A1* 2/2022 Blum ...................... H02J 50/12
2022/0069626 A1* 3/2022 Teply .................... H02J 7/0044
2022/0115916 A1* 4/2022 Jia ......................... H01F 27/366
2022/0200355 A1* 6/2022 Bima .................. H01F 27/2823
2022/0200359 A1* 6/2022 Alam ...................... H02J 50/12
2022/0242258 A1* 8/2022 Mohammad ............ H01F 38/14
2022/0247217 A1* 8/2022 Alam ...................... H02J 50/80
2022/0247233 A1* 8/2022 Mohammad .......... H01F 27/366
2022/0271570 A1* 8/2022 Tokaldani ............. H02J 50/005
2022/0285991 A1* 9/2022 Kim ........................ H02J 50/40
2022/0285993 A1* 9/2022 Luzinski ................. H02J 50/23
2022/0302763 A1* 9/2022 Teply ...................... H01F 38/14
2022/0320904 A1* 10/2022 Li ........................... H02J 50/90
2022/0416577 A1* 12/2022 Alam .................... H02J 50/005
2023/0006476 A1* 1/2023 Fortes Montilla .... H02J 50/402
2023/0074739 A1* 3/2023 Los ......................... H01F 27/24
2023/0110280 A1* 4/2023 Los ....................... H01F 27/366
307/104
2023/0116360 A1* 4/2023 Alam ...................... H02J 50/70
307/104
2023/0157546 A1* 5/2023 Hansen ................ A61B 5/0031
320/108
2023/0187128 A1* 6/2023 Partovi ................. H02J 7/0013
320/108
2023/0216341 A1* 7/2023 Alam ....................... H01Q 1/36
307/104
2023/0231419 A1* 7/2023 Park ...................... B60L 53/122
320/108
2023/0326671 A1* 10/2023 Partovi ................... H02M 3/01
307/31
2023/0361602 A1* 11/2023 Stingu .................. H02J 50/402
2024/0097500 A1* 3/2024 Bima ....................... H01F 38/14
2024/0212927 A1* 6/2024 Partovi ................... H02J 50/70
2024/0258838 A1* 8/2024 Alam .................... H01F 27/366
2024/0266887 A1* 8/2024 Green ...................... H01F 27/24
2024/0270091 A1* 8/2024 Partovi ................. B60L 53/126
2024/0333042 A1* 10/2024 Alam .................... H01F 27/366
2024/0348098 A1* 10/2024 Partovi ................. G06F 1/1635
2024/0371569 A1* 11/2024 Partovi ................... B60L 53/12
2024/0372400 A1* 11/2024 Kim ...................... H02J 50/005
2025/0233463 A1* 7/2025 Green ...................... H01F 27/24
2026/0116224 A1* 4/2026 Partovi ..................... B60L 1/02
2026/0135409 A1* 5/2026 Kim ...................... H02J 50/005

OTHER PUBLICATIONS

Notice of Allowance for U.S. Appl. No. 17/652,829 dated Mar. 7, 2025; 12 pgs.

Notice of Allowance for U.S. Appl. No. 17/652,837, dated Apr. 1, 2025; 20 pgs.

Decision of Grant for Japanese Pat. Application No. 2023-558828, dated Feb. 7, 2025; 2 pgs.

* cited by examiner

MAGNETICS CONFIGURATIONS FOR WIRELESS POWER TRANSFER AND COMMUNICATIONS IN ELECTRONIC DEVICE

CROSS-REFERENCE TO RELATED APPLICATIONS

This application claims priority to U.S. Provisional Application Nos. 63/167,804, 63/167,811, and 63/167,813 all filed Mar. 30, 2021, all of which are entitled "Magnetics Configurations for Wireless Power Transfer and Communications in Electronic Device Accessories;" the disclosure of which is incorporated by reference in its entirety for all purposes. This application is also related to U.S. patent application Ser. Nos. 17/652,829 and 17/652,837 both of which are entitled Magnetics Configurations for Wireless Power Transfer and Communications in Electronic Device Accessories, which are filed contemporaneously herewith and are also hereby incorporated by reference in their entirety.

BACKGROUND

Wireless power transfer ("WPT"), sometimes also known as inductive power transfer ("IPT") has recently become more prevalent in a number of applications. One application in which WPT/IPT has seen increases in use is the consumer electronics space around devices such as mobile phones (i.e., smart phones) and their accessories (e.g., wireless earphones, smart watches, etc.) as well as tablets and other types of portable computers and their accessories (e.g., styluses, etc.).

SUMMARY

A device can include a power receiving coil configured to be magnetically coupled to a power transmitting coil of a wireless power transmitter, wireless power receiving circuitry configured to receive energy from the power receiving coil and charge a battery of the device, the battery being configured to power one or more electronic systems of the device, a processing and communications system powered by the battery, and a wireless communications coil coupled to the processing and communications system, the communications coil comprising one or more windings configured to be magnetically coupled to a Double-D communications coil of the wireless power transmitter to allow communications between the processing and communications system and the wireless power transmitter, wherein the one or more windings of the communications coil are disposed in at least one plane parallel to an axis of symmetry of the Double-D communications coil. The device can be a wireless earphone.

The power receiving coil can include a hemispherical magnetic core and a power winding disposed about an exterior of the hemispherical core. The wireless communication coil can envelop the power winding. The wireless communication coil can envelop the hemispherical core but not the power winding. An effective diameter of the wireless communication coil can be greater than an effective dimeter of the power winding. The power receiving coil can be configured to be disposed within a hemispherical power transmitting coil of the wireless power transmitter. The power receiving coil can be located in a distal end of the accessory. The communications coil can share the hemispherical magnetic core. The one or more windings of the communications coil can be disposed in a plane that is perpendicular to the plane of the Double-D communications coil. The one or more windings of the communications coil can be disposed in a plane that is neither perpendicular nor parallel to the plane of the Double-D communications coil. The one or more windings of the communications coil can be disposed in two or more planes, at least one of which is neither perpendicular nor parallel to the plane of the Double-D communications coil.

A device can include a power transmitting coil configured to be magnetically coupled to a power receiving coil of a wireless power receiver, wireless power transmitting circuitry configured to transmit energy from a battery of the device via the power transmitting coil, a processing and communications system powered by the battery, and a wireless communications coil coupled to the processing and communications system, the communications coil comprising a Double-D winding configured to be magnetically coupled to a communications coil of the wireless power receiver having one or more windings parallel to an axis of symmetry of the Double-D winding to allow communications between the processing and communications system and the wireless power receiver. The device can be an earphone charging case. The earphone charging case can include one or more alignment features configured to position earphones relative to the case for suitable alignment of the coils.

The power transmitting coil can include a hemispherical shell magnetic core and a power winding disposed about an interior of the hemispherical shell magnetic core. The wireless communication coil can be disposed in a recess in a lower portion of the hemispherical shell magnetic core, and an effective diameter of the wireless communication coil is greater than an effective diameter of the power winding. Alternatively, an effective diameter of the wireless communication coil can be less than an effective diameter of the power winding. The power transmitting coil can be located in a portion of the case configured to receive a distal end of the accessory. The communications coil can share the hemispherical shell magnetic core.

DETAILED DESCRIPTION

Figure 1:
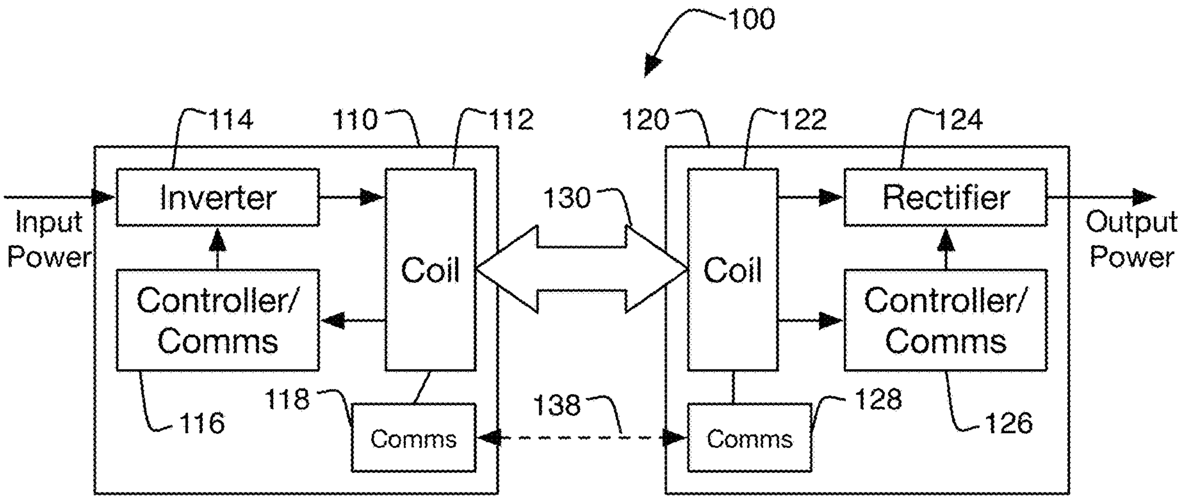
FIG. 1 illustrates a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that wirelessly transfers power to a power receiver (PRx) 120 via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information, and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as an winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above described wireless power transmission system 100 are possible, and the following teachings are applicable to any of such variations and enhancements.

Figure 2:
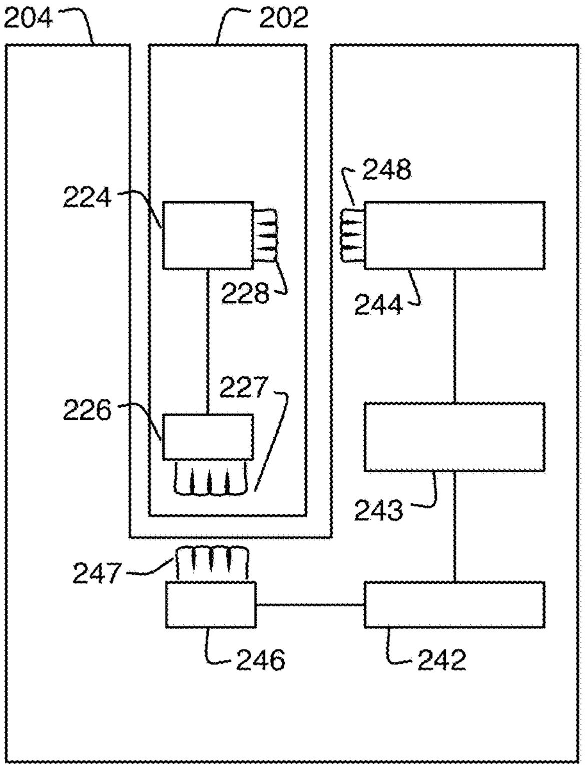
FIG. 2 is a block diagram of an exemplary application of wirelessly powered peripheral and a wireless charging case.

FIG. 2 is a block diagram of an exemplary application of wirelessly powered peripheral 202 and a wireless charging case 204. In one embodiment, the wireless peripheral can be a pair of wireless earphones. The wireless earphones may be designed so that the speaker portion is insertable into a user's ear, with a stem portion containing the other electronic components may extend therefrom. A loudspeaker may be driven with an audio signal produced by a digital to analog converter and amplified by an audio amplifier. The digital to analog converter may receive a digital audio signal from processor and communications module 224. In some embodiments, processor and communications module 224 may receive the digital audio signal from another device, such as a mobile phone, tablet computer, laptop computer, or other source via Bluetooth, WiFi, or another suitable wireless communications protocol. The corresponding radios have not been explicitly shown in the block diagram of FIG. 2, but it will be understood that such radio modules could be built into the processing and communications module or may be separate modules. The various electronic modules making up wireless earphones (or any other peripheral 202) are exemplary only, and there may be additional components (e.g., microphones) or other functional blocks included as appropriate for a given embodiment. Other permutations and combinations as well as different embodiments are also possible.

The electronic systems of wireless peripheral may be powered by an internal rechargeable battery (not shown). The battery may be charged by wireless power transfer with a wireless power receiver (PRx) 226, which can be coupled to a receive coil 227 and configured to receive wireless power from a corresponding transmitter 246 and transmit coil 247 in charging case 204. As an example, the wireless power transfer system may be constructed as described above with respect to FIG. 1. Wireless peripheral 202 may be inserted into a charging case 204, which may have one or more receptacles configured to receive peripheral 202.

These receptacles may be shaped so as to receive and align peripheral 202 so that the wireless power receiver coils 227 in the wireless peripheral 202 are suitably aligned with the corresponding wireless power transmitter coils 247 in the charging case 204. This alignment may be accomplished by the shape of the receptacles (corresponding to the shape of the peripheral 202) and may be further assisted by other features, such as alignment tabs or other fixtures, magnets, or other suitable alignment devices.

Charging case 204 may include its own battery (not shown), which may provide the energy source for charging wireless peripheral 202. This battery may be charged by an external wired or wireless power source (not shown). The case battery may be coupled to a power management circuit 242 that can, in turn, provide power to wireless power transmitter 246, which may be configured to deliver power wirelessly via power transmit coil 247 to corresponding wireless peripheral power receiver coil 227 and wireless power receiver 226. Power management circuit 242 may also be coupled to case processing system 243, which may be a programmable controller configured to operate the charging case. Processing system 243 may be coupled to case communications module 244, which may be configured to provide communications between wireless charging case 204 and wireless peripheral 202. Such communications may be provided by a communications coil 248 configured to be magnetically coupled to a corresponding communications coil 228 of wireless peripheral 202 when wireless peripheral 202 is inserted into the case 204. Although the communications coils may be referred to herein as "transmitter" or "receiver" coils, all such coils may be used bidirectionally, and thus may be transmitting or receiving as the particular context and mode of operation require.

As discussed briefly above with respect to FIG. 1, some wireless power transfer systems have relied on so-called "in-band" communications in which the power delivery from the PTx to the PRx is modulated to provide communications. However, in some cases it may be desirable to provide out-of-band communications. For example, out-of-band communications may allow for higher communications bandwidth. These out-of-band communications have historically relied on radio frequencies for the physical channel. Alternatively, as described herein, magnetic induction may also be used. However, if magnetic induction is to be used for communications and for power delivery, it may be desirable to ensure that there is sufficient isolation between the power transfer path (e.g., from PTx 246 via power transmit coil 247 to power receive coil 227 and PRx 226) and the communications path (between earphone processor/comms module 224 and case comms module 244 via comms coils 228 and 248). Various embodiments for providing such isolation are described below.

Double-D Transmitter and Receiver Communications Coils

In some embodiments, isolation between the magnetic circuit path used for power transfer and the magnetic circuit path used for communications between wireless charging case 204 and wireless accessory 202 (or other wireless devices) may be achieved by providing coil configurations that minimize cross-coupling between the power coils and the communication coils even if the physical separation between the power coils and communications coils is reduced. One coil configuration that can achieve this objective is the use of "Double-D" coils for wireless communications. In these embodiments, two co-planar semi-circular (i.e., D-shaped) windings are used for each of the communications coils, and the planes of the respective Double-D coils are parallel to one another. Although the embodiments described herein use semi-circular coils, it will be appreciated that functionally equivalent coils may be constructed from other closed shapes that are not necessarily semi-circular, but rather include complementary co-planar coils reflected about an axis of symmetry lying in the plane of the coils. Any reference to Double-D coils herein should be construed as referring to any such coil configuration.

The coils may include a winding portion, made up of a number of turns of wire, printed circuit board traces, flexible printed circuit traces, etc. Each of the aforementioned coils may also include a core made of a material having a suitable magnetic permeability, e.g., ferrite, to enhance the performance of the magnetic circuit. Additionally, the accessory side and case side coils may, in some embodiments, share respective magnetic cores. Described below are a series of magnetic circuit configurations employing Double-D communications coils to achieve the desired isolation.

Figure 3A:
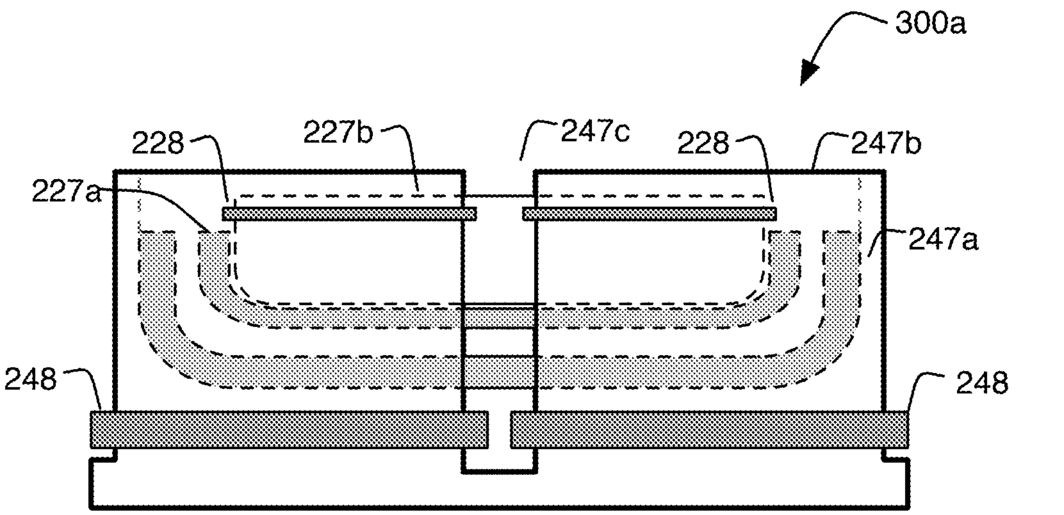
FIGS. 3A-3B illustrate a wireless power transfer system configuration including Double-D communications coils.
Figure 3B:
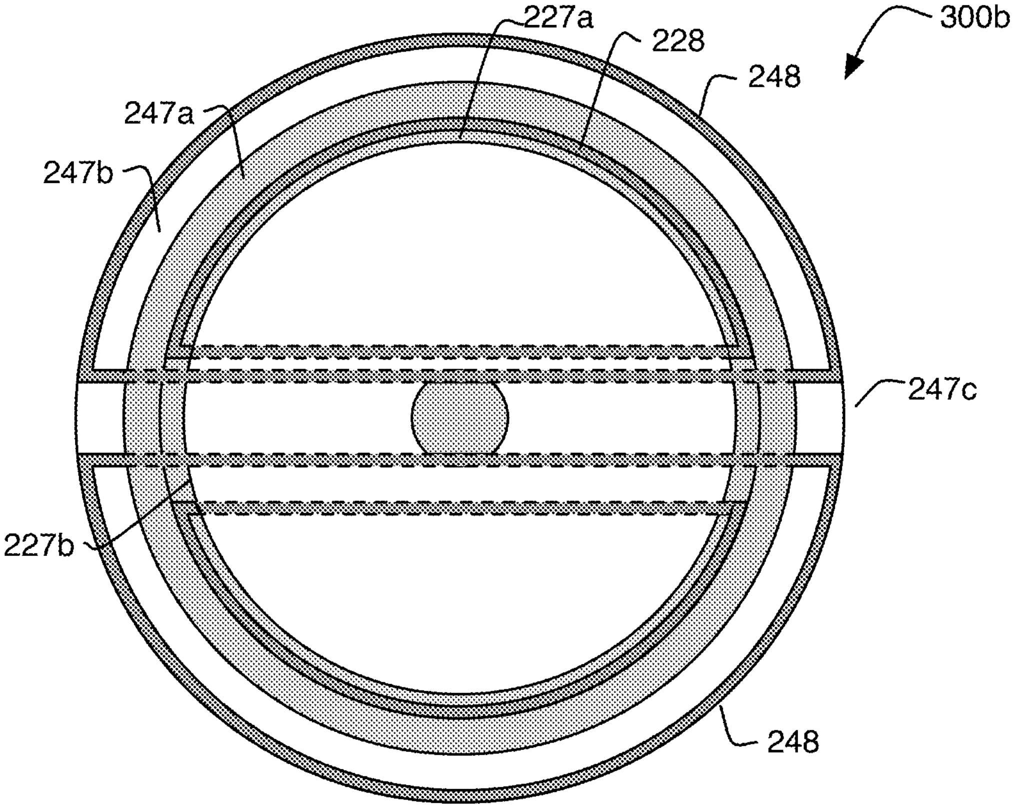

FIGS. 3A-3B illustrate a configuration including Double-D communications coils. More specifically, FIG. 3A includes profile view 300*a*, and FIG. 3B includes plan view 300*b*. The power receiving coil may include a winding portion 227*a* disposed in the wireless accessory. The power receiving coil may also include a magnetic core (a/k/a ferrite) 227*b*. As described in greater detail below, receiver ferrite 227*b* may also be shared by the receiver communications coil. In the illustrated embodiment, ferrite 227*b* has a bowl shape that is quasi-hemispherical with a flat bottom, and winding 227*a* is wound in a complementary fashion on the outside of the core. Thus, power receiving coil may have a bowl shape that is quasi-hemispherical with a flat bottom, which may correspond to a shape of an end of the wireless accessory 202.

Disposed within the case, a corresponding power transmission coil 247 may be positioned so that when the accessory is inserted into the case, the power transmission coil is suitably coupled to power receiving coil 227. Wireless power transmission coil may include a winding portion 247*a* and a magnetic core/ferrite 247*b*. Magnetic core 247*b* may be a bowl shaped shell, or may have a bowl shaped internal shape, so as to correspond to the core of power receiving coil 227. In this case, power transmit winding 247*a* may be wound on the inside of the hemispherical shell, conforming thereto, so as to form a bowl shaped power transmit winding. Thus, when the accessory is disposed within the case, the power receiving coil 227 of the earphone may be located substantially within power transmitting coil 247, allowing for a suitable magnetic coupling between the two to facilitate power transfer. Additionally, power transmit coil core 247*b* may have a slot or air gap 247*c* disposed therein to facilitate manufacturing of the coil and/or to control magnetic flux, as desired. Additionally, although hemispherical power windings are described in the illustrated embodiments, it will be appreciated that substantially planar coil configurations or other three-dimensional coil configurations could also be used as desired or appropriate for a given embodiment.

The wireless accessory 202 may also include a communications coil 228, which may be disposed beneath the receiver ferrite 227*b*, but above the receive power coil 227*a*, as illustrated most clearly in profile view 300*a*. Likewise, magnetic charging case 204 may have disposed therein, in a complementary location, case communications coil 248, located in a recess within a lower portion of transmitter ferrite 247*b*. In the embodiment of FIG. 3A, the case and accessory communications coils 248 and 228 are located outside the projected circumference of the corresponding power coils 247*a* and 227*a*. In other words, the effective diameter of the communications coils is greater than that of the power coils. This may be different in other embodiments described herein. Additionally, the respective halves of each Double-D coil may be wound or driven in opposite directions, such that a magnetic flux associated with one side of the coil is in an opposite direction of the magnetic flux associated with the other side of the coil. For example, a clockwise current in the one winding may produce a flux in an upward direction and a corresponding counter-clockwise current in the other winding may produce a flux in a downward direction. The loop of these upward and downward flux paths may induce corresponding currents in the complementary communications windings while providing a degree of magnetic isolation from the magnetic circuit used for power transmission from the case to the accessory, which has flux in a different direction (caused by the geometry of the power windings). As illustrated in the views of FIGS. 3A-3B, when the accessory is positioned within the case, communications coils 228 and 248 may be suitably aligned to provide sufficient magnetic coupling for the desired communications operations.

Figure 4A:
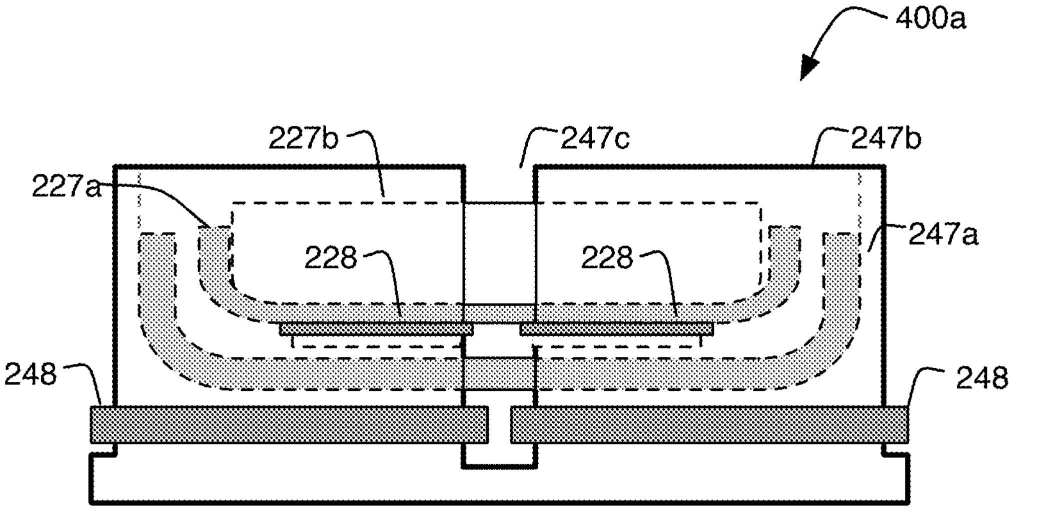
FIGS. 4A-4B, 5A-5B, and 6A-6B illustrate wireless power transfer systems with an alternative Double-D communication coil configurations.
Figure 4B:
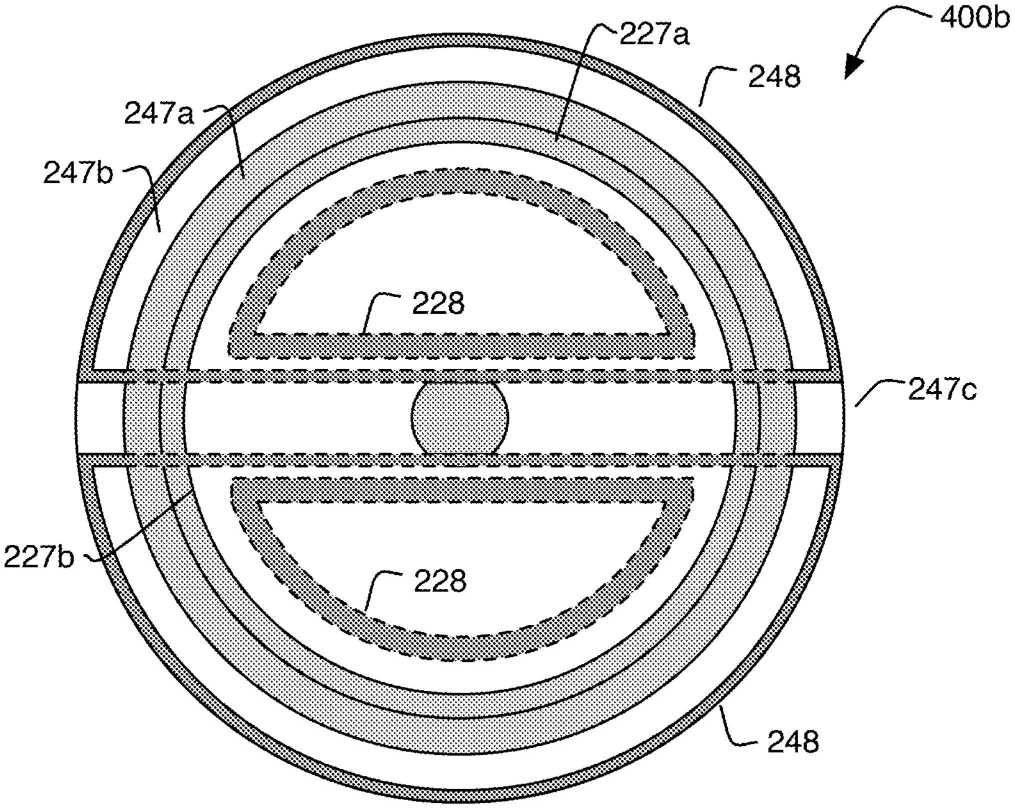

FIGS. 4A-4B illustrate an alternative configuration including Double-D communications coils. More specifically, FIG. 4A profile view 400*a*, and FIG. 4B includes plan view 400*b*. In this embodiment, the power coils are configured as described above with respect to the embodiment of FIGS. 3A-3B. As in that embodiment, although bowl shaped power windings are described in the illustrated embodiments, it will be appreciated that substantially planar coil configurations or other three-dimensional coil configurations could also be used as desired or appropriate for a given embodiment.

Like the embodiment of FIGS. 3A-3B, wireless accessory 202 in the embodiment of FIGS. 4A-4B may also include an accessory communications coil 228, which may be disposed beneath the receiver ferrite 227*b*. However, in this embodiment, accessory communications coil 228 is disposed beneath (rather than above) the receive power coil 227*a*, as illustrated most clearly in profile view 400*c*. Likewise, magnetic charging case 204 may have disposed therein, in a complementary location, case communications coil 248, located in a recess formed in a lower portion of transmitter ferrite 247*b* as described with respect to the embodiment of FIGS. 3A-3B. In the embodiment of FIGS. 4A-4B, the case communications coil 248 is located outside the projected circumference of the power coils 247*b* and 227*b*, while the accessory communications coil 228 is located inside the projected circumference of the power coils. This illustrates a tradeoff in size of the accessory coil versus distance from the case communications coil. As above, the respective halves of each Double-D coil may be wound or driven in opposite directions to provide a degree of magnetic isolation from the magnetic circuit used for power transmission. As illustrated in the views of FIGS. 4A-4B, when the accessory is positioned within the case, communications coils 228 and 248 may be suitably aligned to provide sufficient magnetic coupling for the desired communications operations.

Figure 5A:
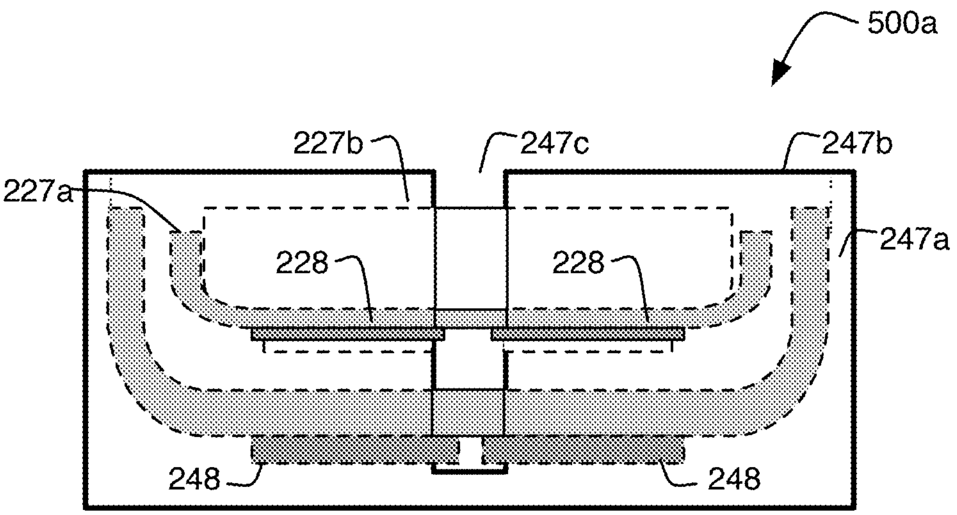
Figure 5B:
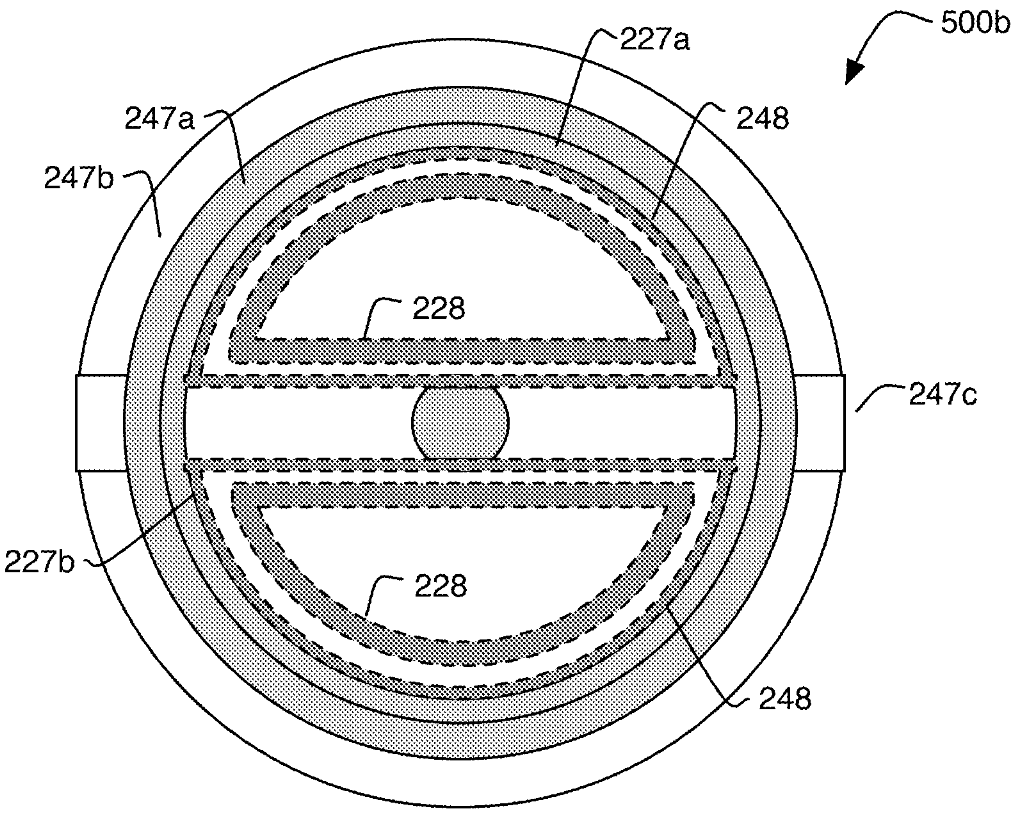

FIGS. 5A-5B illustrate another alternative configuration including Double-D communications coils. More specifically, FIG. 5A includes profile view 500*a*, and FIG. 5B includes plan view 500*b*. In this embodiment, the power coils are configured as described above with respect to the embodiment of FIGS. 3A-3B and 4A-4B. As in those embodiments, although bowl shaped power windings are described in the illustrated embodiments, it will be appreciated that substantially planar coil configurations or other three-dimensional coil configurations could also be used as desired or appropriate for a given embodiment.

Like the embodiment of FIGS. 3A-3B and 4A-4B, wireless accessory 202 in the embodiment of FIGS. 5A-5B may also include an accessory communications coil 228, which may be disposed beneath the receiver ferrite 227*b*, and also beneath the receive power coil 227*a* as illustrated most clearly in profile view 500*a*. Likewise, magnetic charging case 204 may have disposed therein, in a complementary location, case communications coil 248, although in this embodiment case communications coil 248 may be disposed in a recess located in an upper portion of transmitter ferrite 247*b*. In the embodiment of FIGS. 5A-5B, the case communications coil 248 and accessory communications coil 228 are both located inside the projected circumference of the power coils; that is, the effective diameter of the communications coils is smaller than the effective diameter of the power coils. This illustrates a tradeoff in size of the case communications coil versus distance from the accessory communications coil. As above, the respective halves of each Double-D coil may be wound or driven in opposite directions to provide a degree of magnetic isolation from the magnetic circuit used for power transmission. As illustrated in the views of FIGS. 5A-5B, when the accessory is positioned within the case, communications coils 228 and 248 may be suitably aligned to provide sufficient magnetic coupling for the desired communications operations.

Figure 6A:
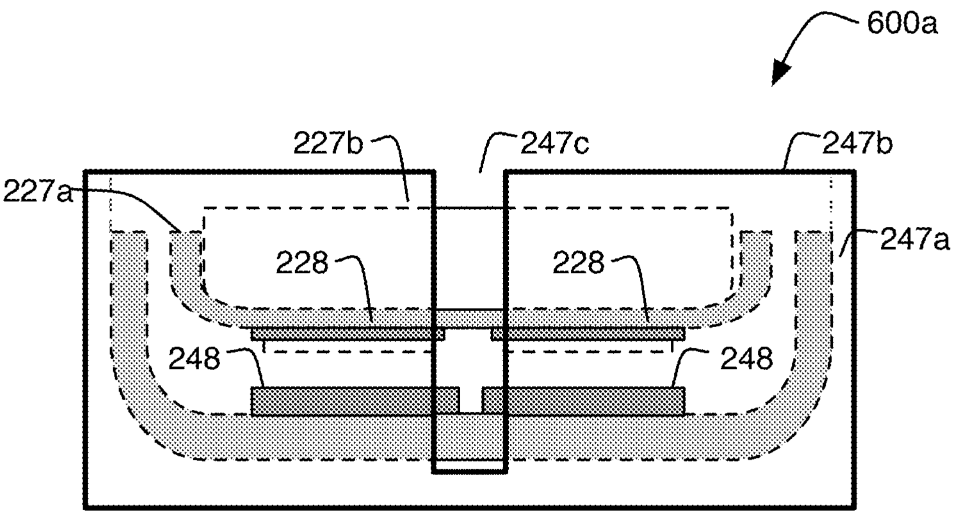
Figure 6B:
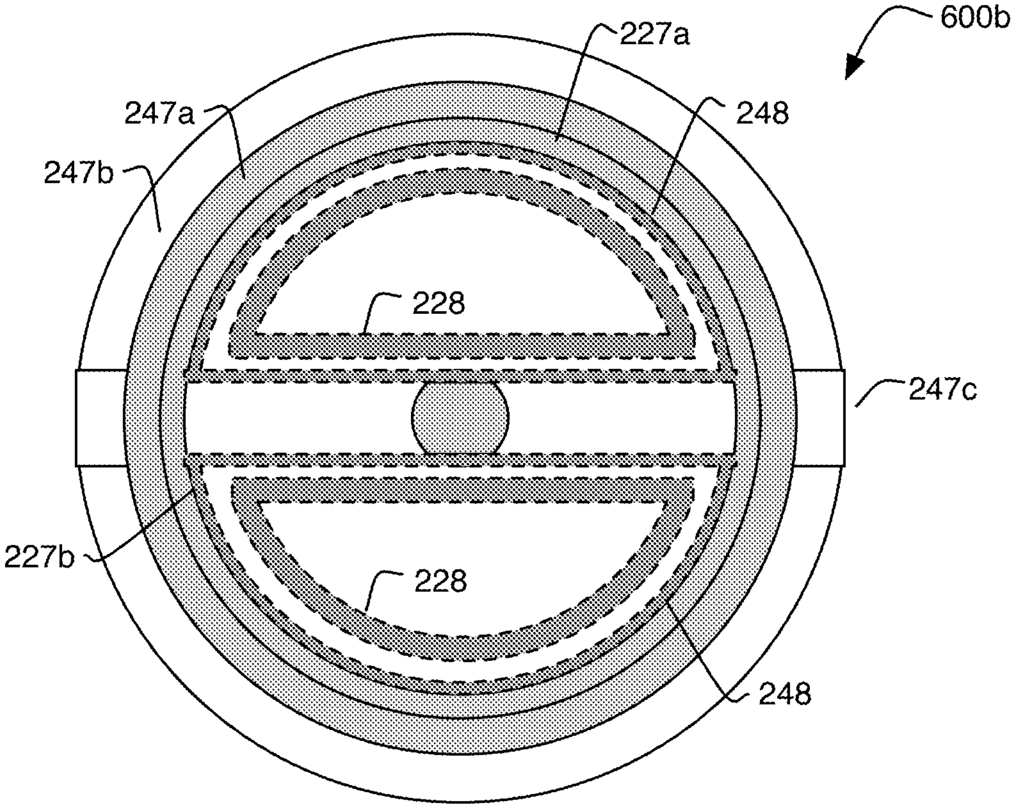

FIGS. 6A-6B illustrate yet another alternative configuration including Double-D communications coils. More specifically, FIG. 6A includes profile view 600*a*; and FIG. 6B includes plan view 600*b*. In this embodiment, the power coils are configured as described above with respect to the embodiment of FIGS. 3A-3B, 4A-4B, and 5A-5B. As in those embodiments, although hemispherical power windings are described in the illustrated embodiments, it will be appreciated that substantially planar coil configurations or other three-dimensional coil configurations could also be used as desired or appropriate for a given embodiment.

Like the embodiment of FIGS. 5A-5B, wireless accessory 202 in the embodiment of FIGS. 6A-6B may also include an accessory communications coil 228, which may be disposed beneath the receiver ferrite 227*b*, and also beneath the receive power coil 227*a*, as illustrated most clearly in profile view 600*a*. Likewise, magnetic charging case 204 may have disposed therein, in a complementary location, case communications coil 248, although in this embodiment case communications coil 248 may be disposed atop an upper portion of transmitter ferrite 247*b* (rather than within a recess of the core, as in the prior embodiments). In the embodiment of FIGS. 6A-6B, the case communications coil 248 and accessory communications coil 228 are both located inside the projected circumference of the power coils; that is, the effective diameter of the communications coils is smaller than the effective diameter of the power coils. This illustrates a tradeoff in size of the case communications coil versus distance from the accessory communications coil. As above, the respective halves of each Double-D coil may be wound or driven in opposite directions to provide a degree of magnetic isolation from the magnetic circuit used for power transmission. As illustrated in the views of FIGS. 6A-6B, when the accessory is positioned within the case, communications coils 228 and 248 may be suitably aligned to provide sufficient magnetic coupling for the desired communications operations.

FIGS. 3EA-3EB and 4FA-3FB illustrate still another alternative configuration including Double-D communications coils. More specifically, FIG. 3EA includes lower isometric view 400*m*, and FIG. 3EB includes profile view 400*n*. Likewise, FIG. 3FA includes lower isometric view 400*o* of the accessory side coils, and FIG. 3FB includes isometric view 400*p* of the complementary case side transmitter coils. The coil configuration of both power and communications coils is as described with respect to FIGS. 3DA-3DC; what is different in the embodiment of FIGS. 3EA-3EB and 4FA-3FB is the hybrid magnetic core configuration described below. Although the hybrid core configuration is described with respect to the winding configuration of FIGS. 3DA-3DC, hybrid core configurations may be used with other winding configurations as described herein.

Figure 7:
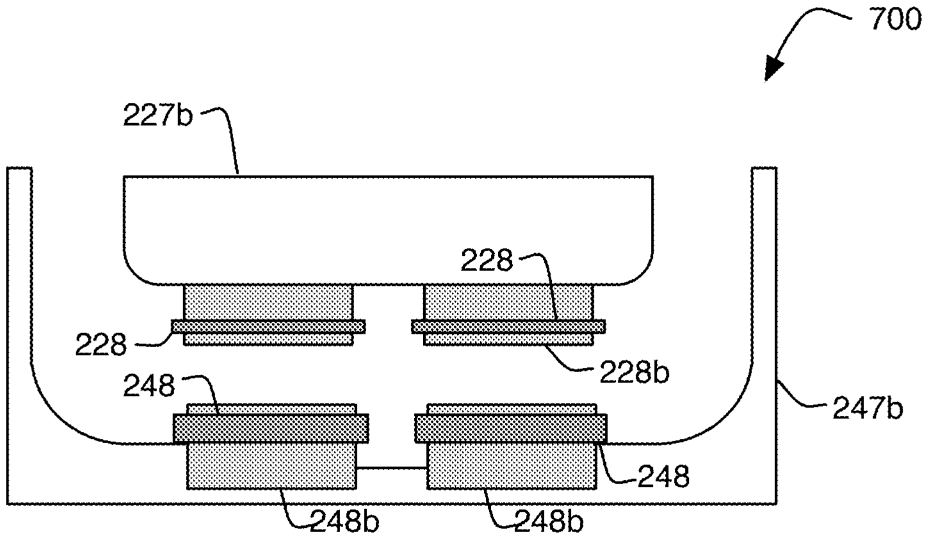
FIG. 7 illustrates a wireless power transfer system with Double-D communications coils and hybrid magnetic cores.

As illustrated in FIG. 7, either or both of the accessory magnetic core and the case magnetic core may be made up of separate components for the core portions associated with the wireless power coils (the "power cores") and the communications coils (the "communications cores"). These separate core components may be made from materials with different magnetic properties, which may be selected, for example, to correspond to differing frequencies used for wireless power transmission versus communications. As shown in cross-sectional profile view 700, the case communications core can include a separate communications portion 248*b*, which is made from a material having differing magnetic properties than the power portion 247*b* of the core. Likewise, the accessory communications core can include a power core portion 227*b* and a communications core portion 228*b*, again with the communications core having different magnetic properties suitable to the specific frequencies used. The respective communications cores may be affixed to their power counterparts using suitable mechanical connection techniques, such as interference fitment with optional alignment fixtures, or may be joined using a suitable adhesive. The various dimensions and aspect ratios may be selected by a skilled designer so as to provide the desired magnetic characteristics for a given application. Both the accessory power winding and case power winding have been omitted from the view of FIG. 7 for better illustration of the core components and the communications coils. However, the power winding configurations may be as described above with respect to the various embodiments.

Various aspects of Double-D communications coils, as described above with respect to FIGS. 3A-7, including communications coil position relative to the corresponding power coil and corresponding magnetic core, as well as hybrid cores having portions made from differing materials selected on the basis of magnetic properties relating to the coil dimensions and frequencies used for power versus communications may be mixed and matched as appropriate in any given application. Thus, there are a wide variety of Double-D communications coil arrangements that may be suitable for any given application depending on the specific objectives and constraints of such a system.

Double-D Transmitter and Vertical Receiver Communications Coils

As noted above, isolation between the magnetic circuit path used for power transfer and the magnetic circuit path used for communications may be achieved by providing coil configurations that minimize cross-coupling between the power coils and the communication coils even if the physical separation between the power coils and communications coils is reduced. Another coil configuration that can achieve this objective is the use of a "Double-D" coils for the transmitter communications coil while using a vertical (or substantially vertical) coil for the receiver communications coil, as will now be illustrated with respect to FIGS. 8A-14B. In these embodiments, the transmitter communications coil 248 includes Double-D windings like those described above. The receiver communications coil 228 can include a single coil oriented perpendicularly to the plane and parallel to the axis of symmetry of the Double-D transmitter communications coil. Like the embodiments discussed above, the coils may include a winding portion, made up of a number of turns of wire, printed circuit board traces, flexible printed circuit traces, etc. Each of the aforementioned coils may also include a core made of a material having a suitable magnetic permeability, e.g., ferrite, to enhance the performance of the magnetic circuit. Additionally, because of the increased proximity between power and communications coils, the accessory side and case side coils may, in some embodiments, share respective magnetic cores. Described below are a series of magnetic circuit configurations employing Double-D communications coils to achieve the desired isolation.

Figure 8A:
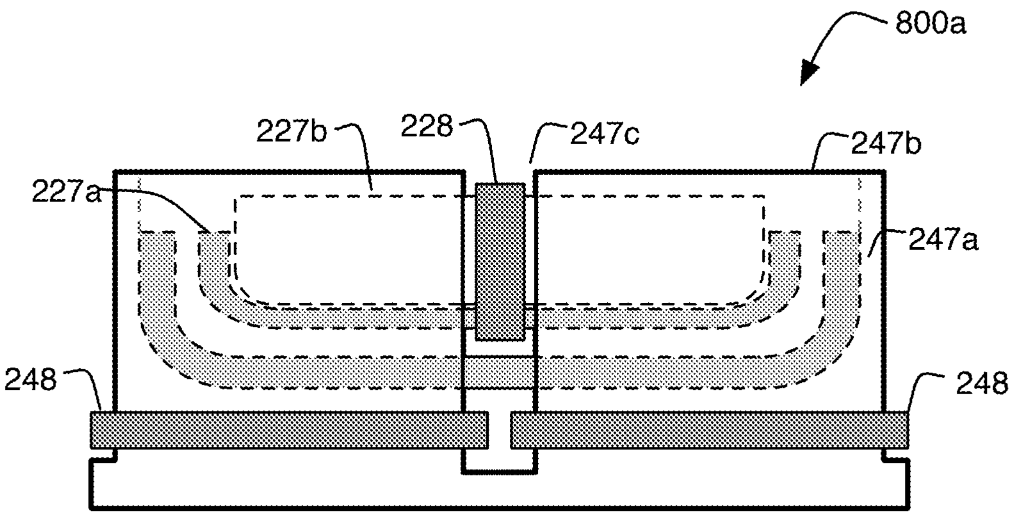
FIGS. 8A-8B illustrate a wireless power transfer system configuration including a Double-D transmitter communications coil and a vertical receiver communications coil.
Figure 8B:
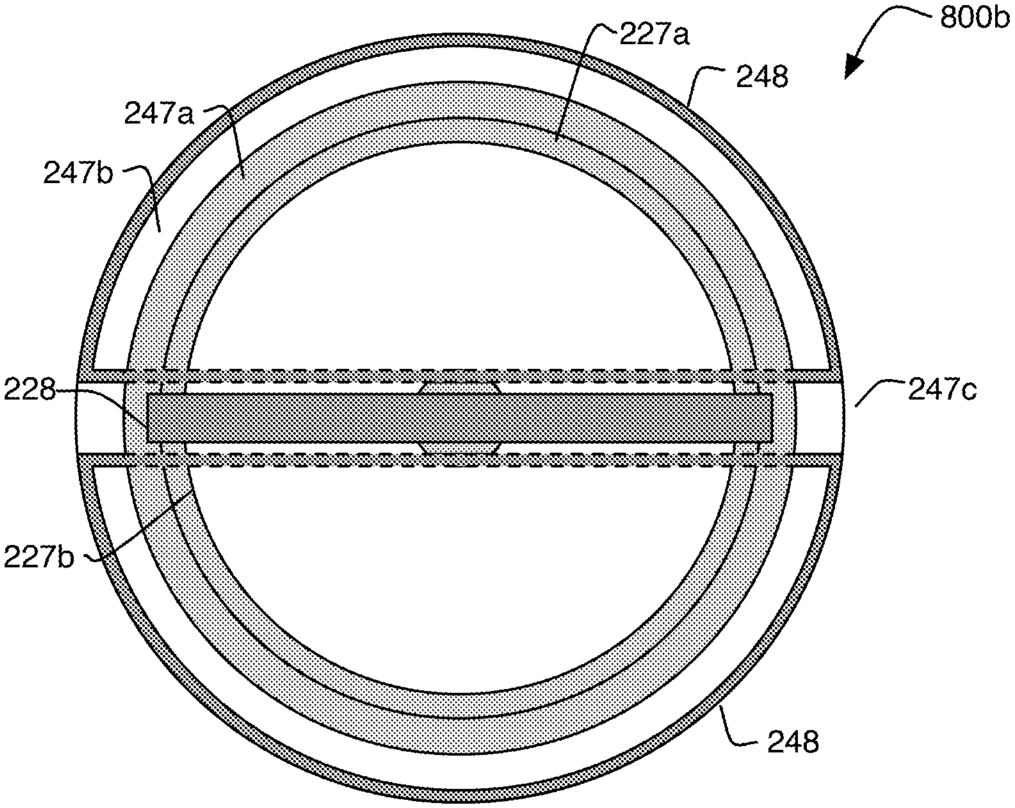

FIGS. 8A-8B illustrate a configuration including a Double-D transmitter communications coil and a vertical receiver communications coil. More specifically, FIG. 8A includes profile view 800*a* and FIG. 8B includes plan view 800*b*. The power receiving coil may include a winding portion 227*a* disposed in a distal end of the stem portion of a wireless accessory. The power receiving coil may also include a magnetic core (a/k/a ferrite) 227*b*. As described in greater detail below, receiver ferrite 227*b* may also be shared by the receiver communications coil. In the illustrated embodiment, ferrite 227*b* has a bowl shape that is quasi-hemispherical with a flat bottom, and winding 227*a* is wound in a complementary fashion on the outside of the core. Thus, power receiving coil may have a bowl shape that is quasi-hemispherical with a flat bottom, which may correspond to a shape of an end of a stem portion of wireless accessory 202.

Disposed within the case, a corresponding power transmission coil 247 may be positioned so that when the accessory is inserted into the case, the power transmission coil is suitably coupled to power receiving coil 227. Wireless power transmission coil may include a winding portion 247*a* and a magnetic core/ferrite 247*b*. Magnetic core 247*b* may be a bowl shaped shell so as to correspond to the core of power receiving coil 227. In this case, power transmit winding 247*a* may be wound on the inside of the hemispherical shell, conforming thereto, so as to form a bowl shaped power transmit winding. Thus, when the accessory is disposed within the case, the power receiving coil 227 of the accessory may be located substantially within power transmitting coil 247, allowing for a suitable magnetic coupling between the two to facilitate power transfer. Additionally, power transmit coil core 247*b* may have a slot or air gap 247*c* disposed therein to facilitate manufacturing of the coil and/or to control magnetic flux, as desired. Additionally, although hemispherical power windings are described in the illustrated embodiments, it will be appreciated that substantially planar coil configurations or other three-dimensional coil configurations could also be used as desired or appropriate for a given embodiment.

The wireless accessory 202 may also include an accessory communications coil 228, which may, for example be wrapped around receiver ferrite 227*b*, also enveloping the receive power coil 227*a*. As noted above, receiver communications coil 228 is in a plane that is perpendicular to the plane of Double-D transmitter communications coil 248 and parallel to the axis of symmetry of the Double-D coils. Likewise, magnetic charging case 204 may have disposed therein, in a complementary location, case communications coil 248, located in a recess within a lower portion of transmitter ferrite 247*b*. In the embodiment of FIGS. 8A-8B, the case and accessory communications coils 248 and 228 are located outside the projected circumference of the corresponding power coils 247*a* and 227*a*. In other words, the effective diameter of the communications coils is greater than that of the power coils. This may be different in other embodiments described herein. Additionally, the respective halves of each Double-D coil may be wound or driven in opposite directions, such that a magnetic flux associated with one side of the coil is in an opposite direction of the magnetic flux associated with the other side of the coil. For example, a clockwise current in the one winding may produce a flux in an upward direction and a corresponding counter-clockwise current in the other winding may produce a flux in a downward direction. The loop of these upward and downward flux paths may induce corresponding currents in the complementary communications winding while providing a degree of magnetic isolation from the magnetic circuit used for power transmission from the case to the accessories, which has flux in a different direction (caused by the geometry of the power windings). As illustrated in the views of FIGS. 8A-8B, when the accessory is positioned within the case, communications coils 228 and 248 may be suitably aligned to provide sufficient magnetic coupling for the desired communications operations.

Figure 9A:
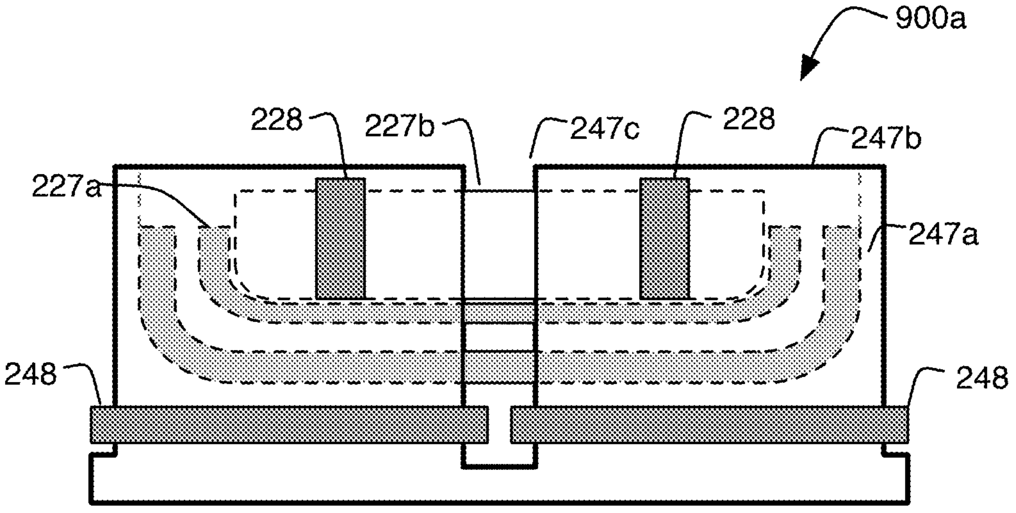
FIGS. 9A-9B, 10A-10B, and 11A-11B illustrate wireless power transfer system configurations including a Double-D transmitter communications coil and various configurations of a two-winding, substantially vertical receiver communications coil.
Figure 9B:
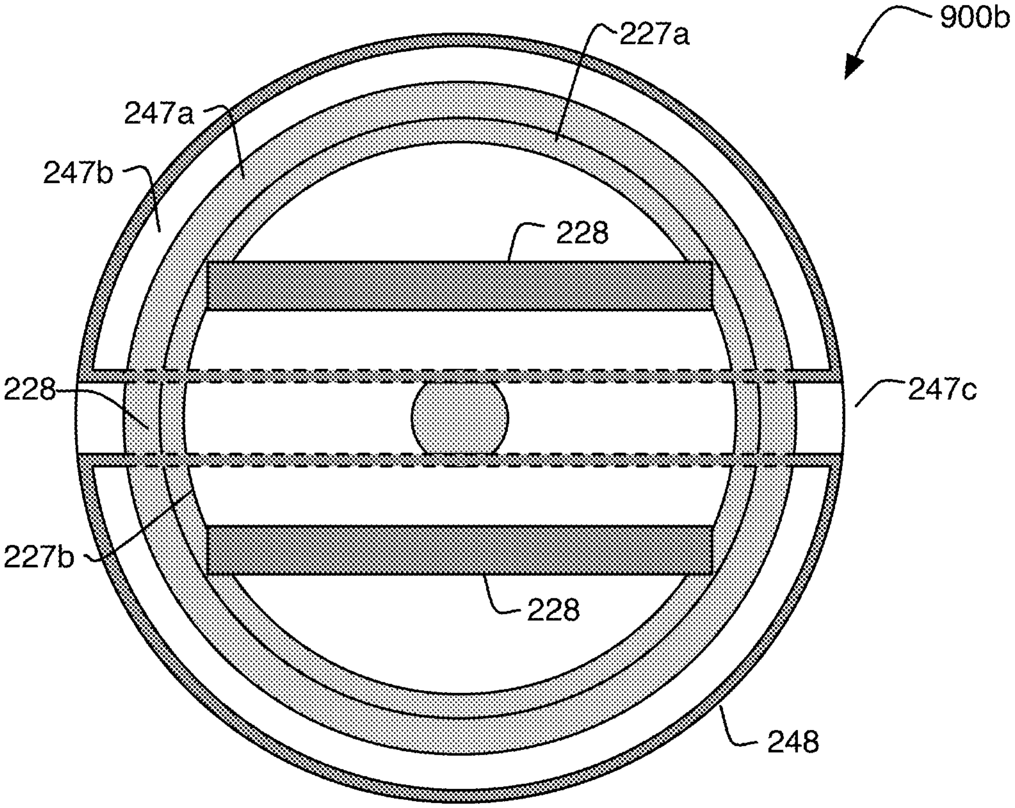

FIGS. 9A-9B illustrate an alternative configuration including a Double-D transmitter coil and two vertical receiver communication coils. More specifically, FIG. 9A includes profile view 900*a*, and FIG. 9B includes plan view 900B. In this embodiment, the power coils are configured as described above with respect to the embodiment of FIGS. 8A-8B. As in that embodiment, although hemispherical power windings are described in the illustrated embodiments, it will be appreciated that substantially planar coil configurations or other three-dimensional coil configurations could also be used as desired or appropriate for a given embodiment.

The wireless accessory 202 may also include an accessory communications coil 228, which may, for example be wrapped around receiver ferrite 227*b*, without enveloping the receive power coil 227*a* as in the embodiment of FIGS. 8A-8B. Rather, receiver communications coils 228 wrap only around receiver ferrite 227*b* and are located above the receiver power coil 227*a*. Each receiver communications coil 228 may be in a plane perpendicular the plane of and parallel to the axis of symmetry of Double-D transmitter communications coil 248. Receiver ferrite 227*b* may include notches to facilitate construction, positioning, and/or retention of the receiver communications coils 228.

Figure 10A:
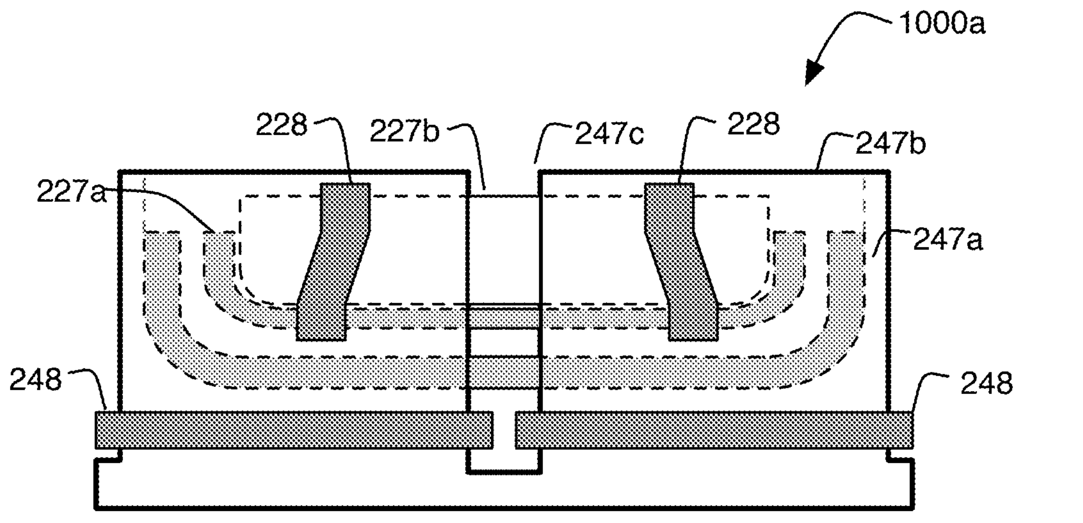
Figure 10B:
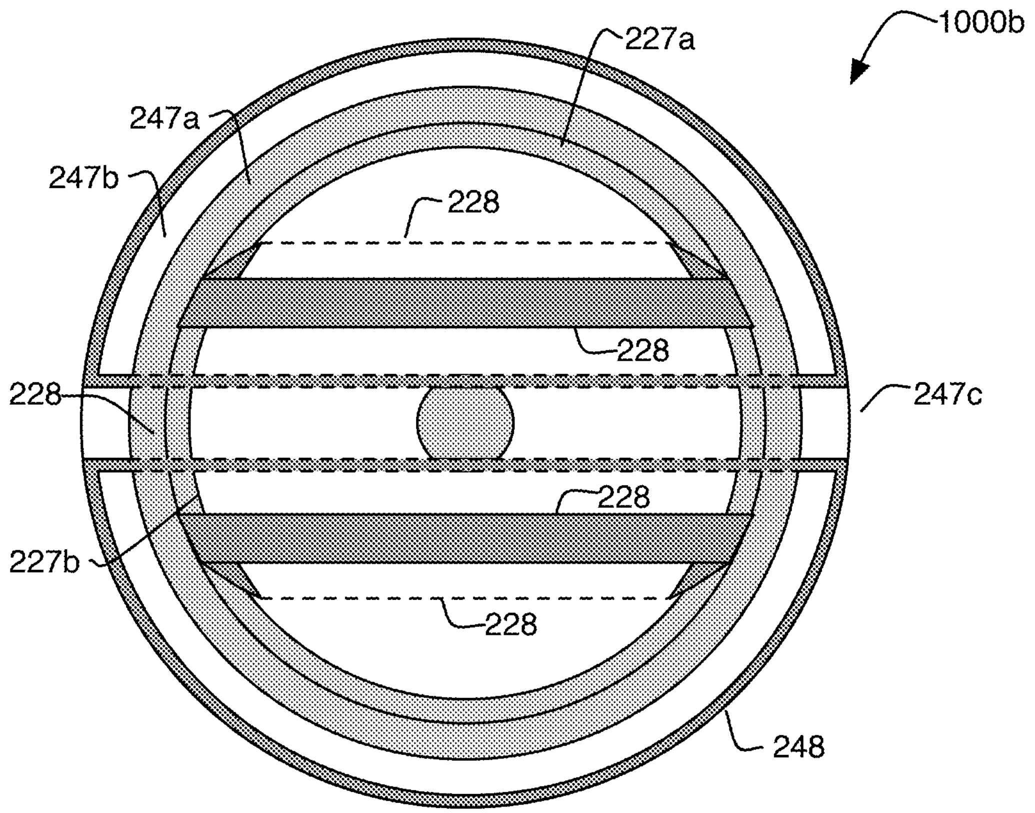

Magnetic charging case 204 may have disposed therein, in a complementary location, case communications coil 248, located in a recess within a lower portion of transmitter ferrite 247*b*. In the embodiment of FIGS. 10A-10B, the case communications coil 248 is located outside the projected circumference of the corresponding power coil 247*a*, while the accessory communication coil 228 is located inside the projected circumference of the corresponding power coil 227*a*. In other words, the effective diameter of the case communication coil is greater than that of the case power coil, while the effective diameter of the accessory communication coils is less than that of the accessory power coil. This may be different in other embodiments described herein. Additionally, the respective halves of the Double-D coil transmitter may be wound or driven in opposite directions, such that a magnetic flux associated with one side of the coil is in an opposite direction of the magnetic flux associated with the other side of the coil. For example, a clockwise current in the one winding may produce a flux in an upward direction and a corresponding counter-clockwise current in the other winding may produce a flux in a downward direction. The loop of these upward and downward flux paths may induce corresponding currents in the complementary communications coil windings while providing a degree of magnetic isolation from the magnetic circuit used for power transmission from the case to the accessories, which has flux in a different direction (caused by the geometry of the power windings). As illustrated in the views of FIG. 9A-9B, when the accessory is positioned within the case, communications coils 228 and 248 may be suitably aligned to provide sufficient magnetic coupling for the desired communications operations.

FIGS. 10A-10B illustrate another alternative configuration including a Double-D transmitter coil and two vertical receiver communication coils. More specifically, FIG. 10A includes profile view 1000*a* and FIG. 11B includes plan view 1000*b*. In this embodiment, the power coils are configured as described above with respect to the embodiment of FIGS. 8A-8B. As in that embodiment, although hemispherical power windings are described in the illustrated embodiments, it will be appreciated that substantially planar coil configurations or other three-dimensional coil configurations could also be used as desired or appropriate for a given embodiment.

The wireless accessory 202 may also include an accessory communications coil 228, which may, for example be wrapped around receiver ferrite 227*b*, enveloping the receive power coil 227*a* as in the embodiment of FIGS. 8A-8B. In this embodiment, each receiver communications coil winding may be in one or more planes that are not parallel but also need not be strictly perpendicular to the plane of Double-D transmitter communications coil 248. Additionally, each receiver communications coil winding need not be strictly planar, although the general shape of the coil may still roughly define one or more planes that are not parallel to, but may be generally, if not strictly perpendicular to the plane of the transmitter communications coil but are all parallel to the axis of symmetry of Double-D transmitter communications coil 248. Receiver ferrite 227*b* may include notches 504 to facilitate construction, positioning, and/or retention of the receiver communications coils 228.

Magnetic charging case 204 may have disposed therein, in a complementary location, case communications coil 248, located in a recess within a lower portion of transmitter ferrite 247*b*. In the embodiment of FIGS. 10A-10B, the case and accessory communications coils 248 and 228 are located outside the projected circumference of the corresponding power coils 247*a* and 227*a*. In other words, the effective diameter of the communications coils is greater than that of the power coils. This may be different in other embodiments described herein. Additionally, the respective halves of the Double-D coil transmitter may be wound or driven in opposite directions, such that a magnetic flux associated with one side of the coil is in an opposite direction of the magnetic flux associated with the other side of the coil. For example, a clockwise current in the one winding may produce a flux in an upward direction and a corresponding counter-clockwise current in the other winding may produce a flux in a downward direction. The loop of these upward and downward flux paths may induce corresponding currents in the complementary communications coil windings while providing a degree of magnetic isolation from the magnetic circuit used for power transmission from the case to the accessories, which has flux in a different direction (caused by the geometry of the power windings). As illustrated in the views of FIG. 10A-10B, when the accessory is positioned within the case, communications coils 228 and 248 may be suitably aligned to provide sufficient magnetic coupling for the desired communications operations.

Figure 11A:
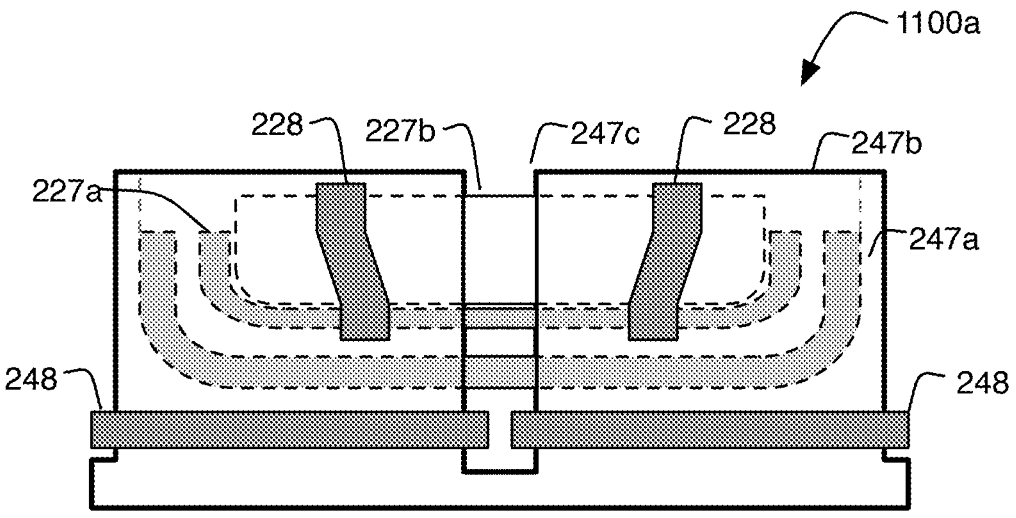
Figure 11B:
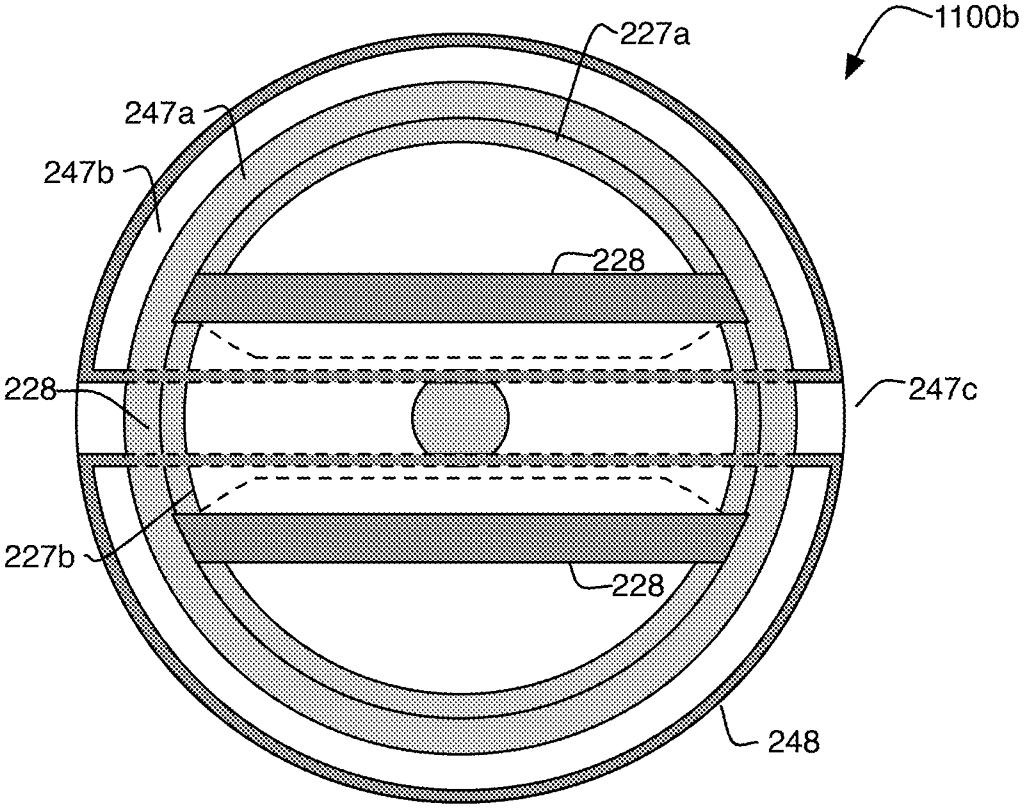

FIGS. 11A-11B illustrate yet another alternative configuration including a Double-D transmitter coil and two vertical receiver communication coils. More specifically, FIG. 11A includes profile view 1100*a* and FIG. 11B includes plan view 1100*b*. In this embodiment, the power coils are configured as described above with respect to the embodiment of FIGS. 8A-8B. As in that embodiment, although hemispherical power windings are described in the illustrated embodiments, it will be appreciated that substantially planar coil configurations or other three-dimensional coil configurations could also be used as desired or appropriate for a given embodiment.

The wireless accessory 202 may also include an accessory communications coil 228, which may, for example be wrapped around receiver ferrite 227*b*, enveloping the receive power coil 227*a* as in the embodiment of FIGS. 4AA-4AC. In this embodiment, each receiver communications coil winding may be in one or more planes that are not parallel but also need not be strictly perpendicular to the plane of Double-D transmitter communications coil 248. Additionally, each receiver communications coil winding need not be strictly planar, although the general shape of the coil may still roughly define one or more planes that are not parallel to, but may be generally, if not strictly perpendicular to the plane of the transmitter communications coil but are all parallel to the axis of symmetry of Double-D transmitter communications coil 248. Receiver ferrite 227*b* may include notches to facilitate construction, positioning, and/or retention of the receiver communications coils 228.

Magnetic charging case 204 may have disposed therein, in a complementary location, case communications coil 248, located in a recess within a lower portion of transmitter ferrite 247*b*. In the embodiment of FIGS. 11A-11B, the case and accessory communications coils 248 and 228 are located outside the projected circumference of the corresponding power coils 247*a* and 227*a*. In other words, the effective diameter of the communications coils is greater than that of the power coils. This may be different in other embodiments described herein. Additionally, the respective halves of the Double-D coil transmitter may be wound or driven in opposite directions, such that a magnetic flux associated with one side of the coil is in an opposite direction of the magnetic flux associated with the other side of the coil. For example, a clockwise current in the one winding may produce a flux in an upward direction and a corresponding counter-clockwise current in the other winding may produce a flux in a downward direction. The loop of these upward and downward flux paths may induce corresponding currents in the complementary communications coil windings while providing a degree of magnetic isolation from the magnetic circuit used for power transmission from the case to the accessories, which has flux in a different direction (caused by the geometry of the power windings). As illustrated in the views of FIGS. 11A-11B, when the accessory is positioned within the case, communications coils 228 and 248 may be suitably aligned to provide sufficient magnetic coupling for the desired communications operations.

Figure 12A:
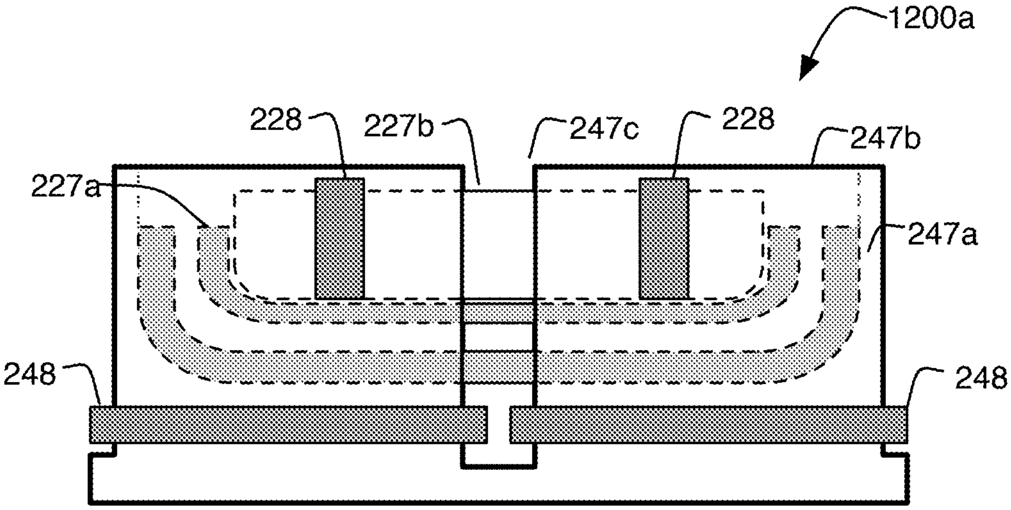
FIGS. 12A-12B and 13A-13B illustrate an exemplary wireless power transfer system configuration including an alternative Double-D transmitter communications coil substantially vertical receiver communications coils.
Figure 12B:
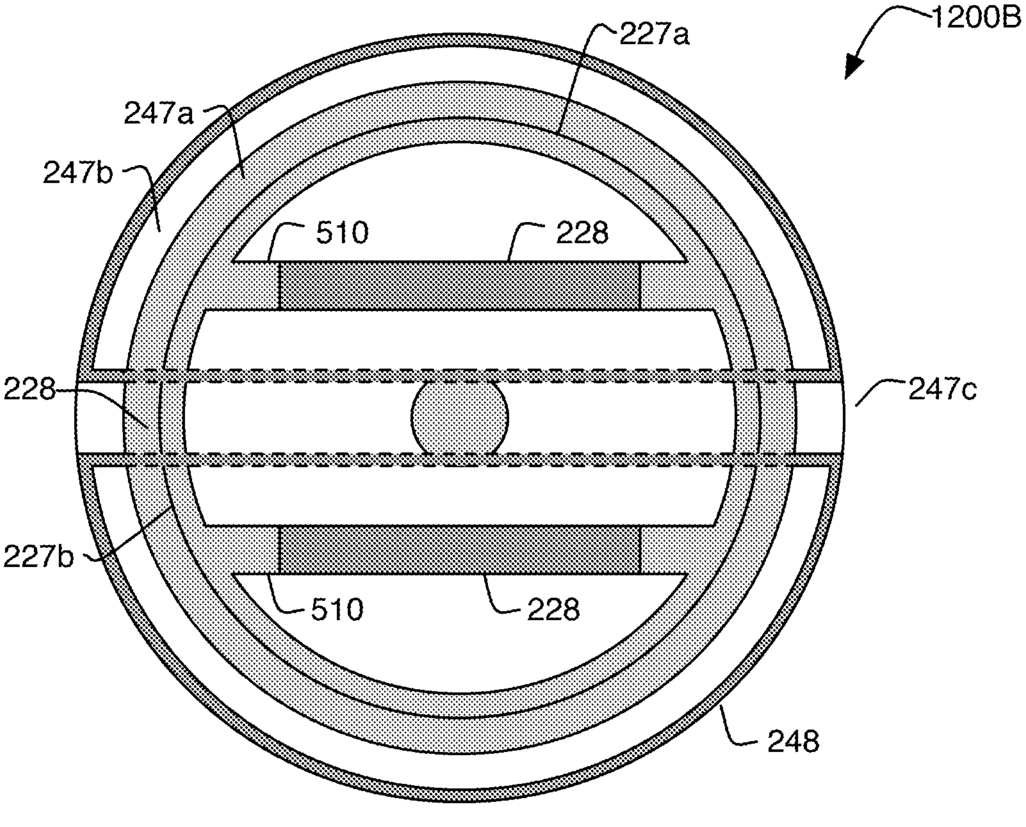

FIGS. 12A-12B illustrates still another alternative configuration including a Double-D transmitter coil and two vertical receiver communication coils. More specifically, FIG. 12A includes profile view 1200*a* and FIG. 12B includes plan view 1200*b*. In this embodiment, the power coils are configured as described above with respect to the embodiment of FIGS. 8A-8B. As in that embodiment, although hemispherical power windings are described in the illustrated embodiments, it will be appreciated that substantially planar coil configurations or other three-dimensional coil configurations could also be used as desired or appropriate for a given embodiment.

The wireless accessory 202 may also include an accessory communications coil 228, which may, for example be wrapped around receiver ferrite 227*b*, but not enveloping the receive power coil 227*a* as in the embodiment of FIGS. 8A-8B. In this embodiment, each receiver communications coil winding may be in a plane that is perpendicular the plane of Double-D transmitter communications coil 248 and parallel to the axis of symmetry of Double-D transmitter communications coil 248. Receiver ferrite 227*b* may include notches 510 to facilitate construction, positioning, and/or retention of the receiver communications coils 228. In the illustrated embodiment, these notches may be substantially deeper than in some embodiments described above to facilitate positioning of the receiver communications coils 228 inside the effective diameter of receiver power coil winding 227*a*.

Magnetic charging case 204 may have disposed therein, in a complementary location, case communications coil 248, located in a recess within a lower portion of transmitter ferrite 247*b*. In the embodiment of FIGS. 12A-12B, the case and accessory communications coils 248 and 228 are located inside the projected circumference of the corresponding power coils 247*a* and 227*a*. In other words, the effective diameter of the communications coils is less than that of the power coils. Additionally, the respective halves of the Double-D coil transmitter may be wound or driven in opposite directions, such that a magnetic flux associated with one side of the coil is in an opposite direction of the magnetic flux associated with the other side of the coil. For example, a clockwise current in the one winding may produce a flux in an upward direction and a corresponding counter-clockwise current in the other winding may produce a flux in a downward direction. The loop of these upward and downward flux paths may induce corresponding currents in the complementary communications coil windings while providing a degree of magnetic isolation from the magnetic circuit used for power transmission from the case to the accessories, which has flux in a different direction (caused by the geometry of the power windings). As illustrated in the views of FIGS. 12A-12B, when the accessory is positioned within the case, communications coils 228 and 248 may be suitably aligned to provide sufficient magnetic coupling for the desired communications operations.

Figure 13A:
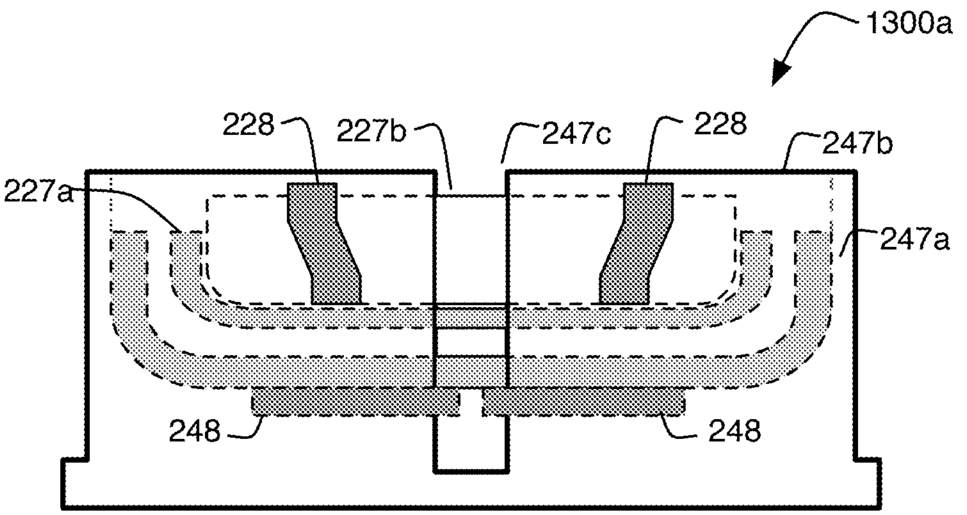
Figure 13B:
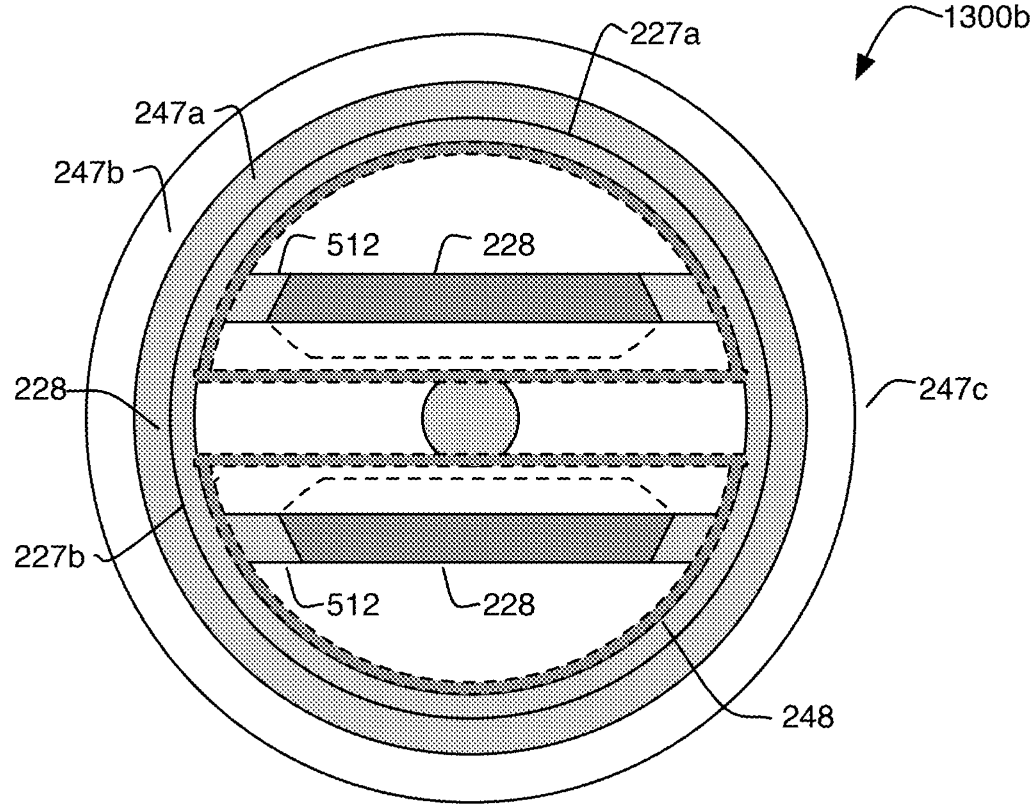

FIGS. 13A-13B illustrate still another alternative configuration including a Double-D transmitter coil and two vertical receiver communication coils. More specifically, FIG. 13A includes profile view 1300*a* and FIG. 13B includes plan view 1300*b*. In this embodiment, the power coils are configured as described above with respect to the embodiment of FIGS. 8A-8B. As in that embodiment, although hemispherical power windings are described in the illustrated embodiments, it will be appreciated that substantially planar coil configurations or other three-dimensional coil configurations could also be used as desired or appropriate for a given embodiment.

The wireless accessory 202 may also include an accessory communications coil 228, which may, for example be wrapped around receiver ferrite 227*b*, within the receive power coil 227*a* as in the embodiment of FIGS. 9A-9B. In this embodiment, each receiver communications coil winding may be in one or more planes that are not parallel but also need not be strictly perpendicular to the plane of Double-D transmitter communications coil 248 as in FIGS. 10A-11B. Additionally, each receiver communications coil winding need not be strictly planar, although the general shape of the coil may still roughly define one or more planes that are not parallel to, but may be generally, if not strictly perpendicular to the plane of the transmitter communications coil but are all parallel to the axis of symmetry of Double-D transmitter communications coil 248. Receiver ferrite 227*b* may include notches 512 to facilitate construction, positioning, and/or retention of the receiver communications coils 228.

Magnetic charging case 204 may have disposed therein, in a complementary location, case communications coil 248, located in a recess within a lower portion of transmitter ferrite 247*b*. In the embodiment of FIGS. 9A-9B, the transmitter communications coils 248 are located inside the projected circumference of the corresponding power coils 247*a*, while the receiver communications coils 228 are located outside the projected circumference of the corresponding power coils 227*a*. Additionally, the respective halves of the Double-D coil transmitter may be wound or driven in opposite directions, such that a magnetic flux associated with one side of the coil is in an opposite direction of the magnetic flux associated with the other side of the coil. For example, a clockwise current in the one winding may produce a flux in an upward direction and a corresponding counter-clockwise current in the other winding may produce a flux in a downward direction. The loop of these upward and downward flux paths may induce corresponding currents in the complementary communications coil windings while providing a degree of magnetic isolation from the magnetic circuit used for power transmission from the case to the accessories, which has flux in a different direction (caused by the geometry of the power windings). As illustrated in the views of FIGS. 13A-13B, when the accessory is positioned within the case, communications coils 228 and 248 may be suitably aligned to provide sufficient magnetic coupling for the desired communications operations.

Vertical Transmitter Communications Coils

Figure 14A:
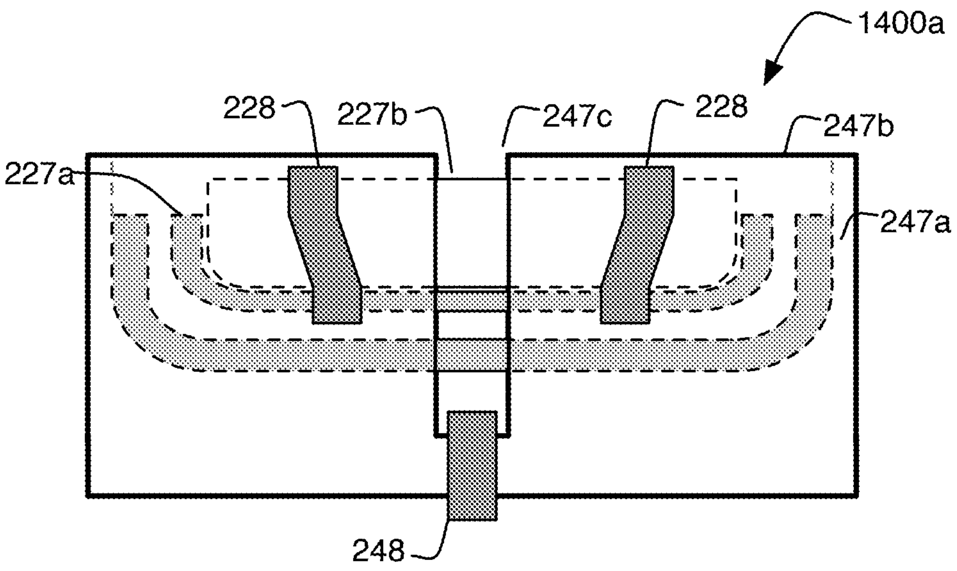
FIGS. 14A-14B and 15A-15B illustrate wireless power transfer system configurations including a substantially vertical transmitter communications coil and a substantially vertical receiver communications coil.
Figure 14B:
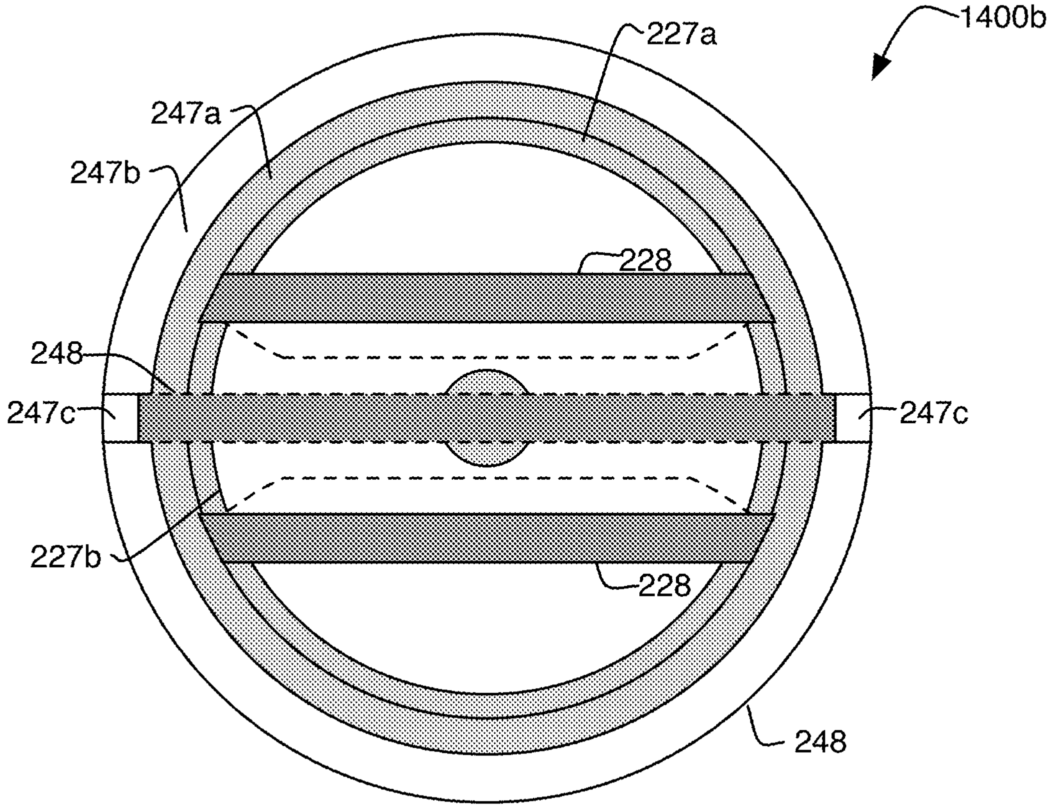

FIGS. 14A-14B illustrate a configuration including a (substantially) vertical transmitter communications coil and a (substantially) vertical receiver communications coil. By substantially vertical, it is meant that the orientation of the plane of the communications coil is generally orthogonal to the plane of the power coils, so as to provide a sufficient degree of electromagnetic isolation between the power and communications coils, thereby preventing interference or cross-talk between the coils. More specifically, FIG. 14A includes profile view 1400*a* and FIG. 14B includes plan view 1400*b*. The power receiving coil may include a winding portion 227*a* disposed in a distal end of the stem portion of a wireless accessory. The power receiving coil may also include a magnetic core (a/k/a ferrite) 227*b*. As described in greater detail below, receiver ferrite 227*b* may also be shared by the receiver communications coil. In the illustrated embodiment, ferrite 227*b* has a bowl shape that is quasi-hemispherical with a flat bottom, and winding 227*a* is wound in a complementary fashion on the outside of the core. Thus, power receiving coil may have a bowl shape that is quasi-hemispherical with a flat bottom, which may correspond to a shape of an end of a stem portion of wireless accessory 202.

Disposed within the case, a corresponding power transmission coil 247 may be positioned so that when the accessory is inserted into the case, the power transmission coil is suitably coupled to power receiving coil 227. Wireless power transmission coil may include a winding portion 247*a* and a magnetic core/ferrite 247*b*. Magnetic core 247*b* may be a bowl shaped shell so as to correspond to the core of power receiving coil 227. In this case, power transmit winding 247*a* may be wound on the inside of the hemispherical shell, conforming thereto, so as to form a bowl shaped power transmit winding. Thus, when the accessory is disposed within the case, the power receiving coil 227 of the accessory may be located substantially within power transmitting coil 247, allowing for a suitable magnetic coupling between the two to facilitate power transfer. Additionally, power transmit coil core 247*b* may have a slot or air gap 247*c* disposed therein to facilitate manufacturing of the coil and/or to control magnetic flux, as desired. Additionally, although hemispherical power windings are described in the illustrated embodiments, it will be appreciated that substantially planar coil configurations or other three-dimensional coil configurations could also be used as desired or appropriate for a given embodiment.

The wireless accessory 202 may also include an accessory communications coil 228, which may, for example be wrapped around receiver ferrite 227*b*, also enveloping the receive power coil 227*a*. The receiver communications coil configuration illustrated in FIGS. 14A-14B corresponds to that described above with reference to FIGS. 11A-11B, although any of the above-described receiver communications coil configurations, including both the substantially vertical coil configurations as well as the Double-D coil configurations, may be used in conjunction with a substantially vertical transmitter coil as described below. Accessory communications coil 228 may be wrapped around receiver ferrite 227*b*, enveloping the receive power coil 227*a*. In this embodiment, each receiver communications coil winding may be in one or more substantially vertical planes that are at least generally parallel to the plane of vertical transmitter communications coil 248, discussed further below.

Likewise, magnetic charging case 204 may have disposed therein, in a complementary location, case communications coil 248, wound around a lower portion of transmitter ferrite 247*b* (taking advantage of slots 247*c*). In the embodiment of FIGS. 14A-14B, the case and accessory communications coils 248 and 228 are located inside the projected circumference of the corresponding power coils 247*a* and 227*a*. In other words, the effective diameter of the communications coils is less than that of the power coils. This may be different in other embodiments described herein. This winding configuration may provide for differing flux directions as compared to the power windings, thereby providing a degree of magnetic isolation from the magnetic circuit used for power transmission from the case to the accessories, which has flux in a different direction (caused by the geometry of the power windings). As illustrated in the views of FIGS. 14A-14B, when the accessory is positioned within the case, communications coils 228 and 248 may be suitably aligned to provide sufficient magnetic coupling for the desired communications operations.

Figure 15A:
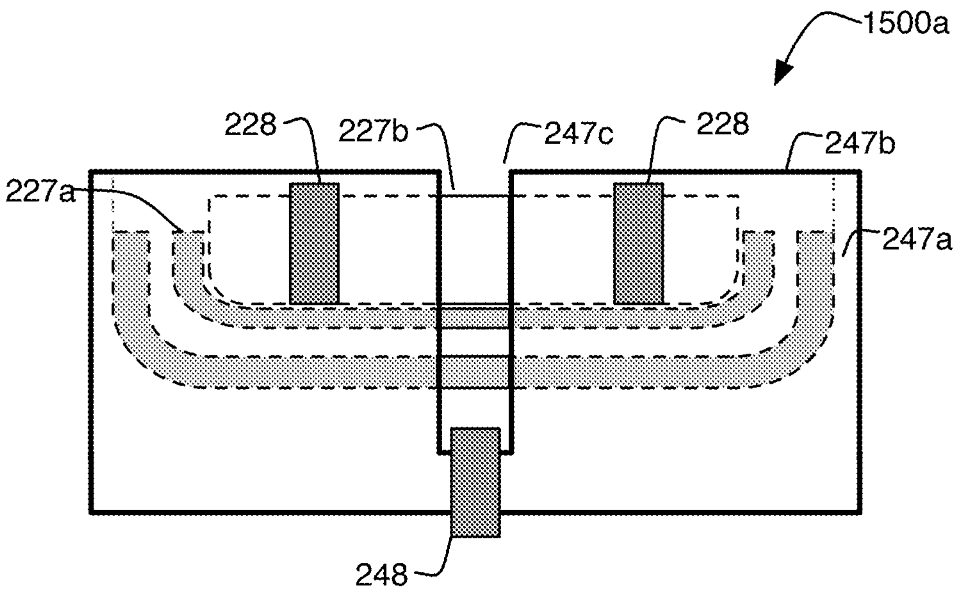
Figure 15B:
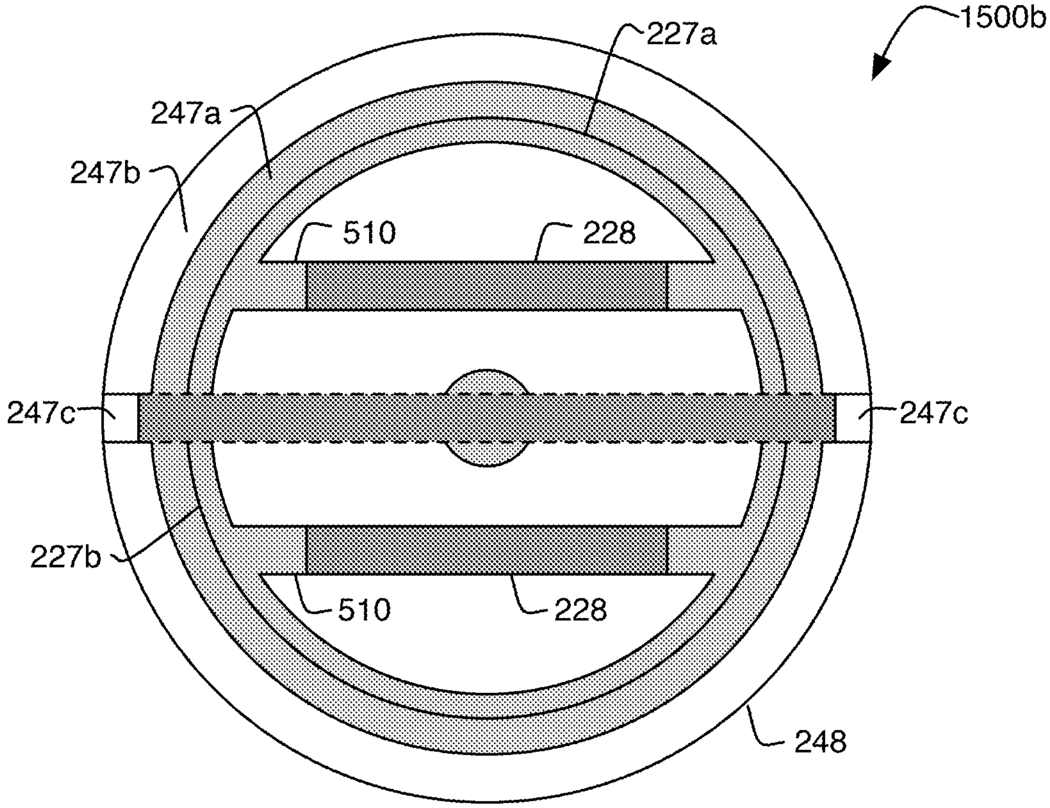

FIGS. 15A-15B illustrate an alternative configuration including a (substantially) vertical transmitter and receiver coils. More specifically, FIG. 15A includes profile view 1500*a*, and FIG. 15B includes plan view 1500*b*. In this embodiment, the power coils are configured as described above with respect to the embodiment of FIGS. 14A-14B. As in that embodiment, although hemispherical power windings are described in the illustrated embodiments, it will be appreciated that substantially planar coil configurations or other three-dimensional coil configurations could also be used as desired or appropriate for a given embodiment.

The wireless accessory 202 may also include an accessory communications coil 228, which may, for example be wrapped around receiver ferrite 227*b*, also enveloping the receive power coil 227*a*. The receiver communications coil configuration illustrated in FIGS. 15A-15B corresponds to that described above with reference to FIGS. 12A-12B, although any of the above-described receiver communications coil configurations, including both the substantially vertical coil configurations as well as the Double-D coil configurations, may be used in conjunction with a substantially vertical transmitter coil. In this embodiment, each receiver communications coil winding may be in a plane that is at least generally parallel to the plane of transmitter communications coil 248. In the illustrated embodiment, the planes of the respective transmitter and receiver coils are parallel. Receiver ferrite 227*b* may include notches 510 to facilitate construction, positioning, and/or retention of the receiver communications coils 228. In the illustrated embodiment, these notches may be substantially deeper than in some embodiments described above to facilitate positioning of the receiver communications coils 228 inside the effective diameter of receiver power coil winding 227*a*.

Likewise, magnetic charging case 204 may have disposed therein, in a complementary location, case communications coil 248, wound around a lower portion of transmitter ferrite 247*b* (taking advantage of slots 247*c*) as described above with respect to FIGS. 14A-14B. In the embodiment of FIGS. 15A-15B, the case and accessory communications coils 248 and 228 are located inside the projected circumference of the corresponding power coils 247*a* and 227*a*. In other words, the effective diameter of the communications coils is less than that of the power coils. This may be different in other embodiments described herein. This winding configuration may provide for differing flux directions as compared to the power windings, thereby providing a degree of magnetic isolation from the magnetic circuit used for power transmission from the case to the accessories, which has flux in a different direction (caused by the geometry of the power windings). As illustrated in the views of FIGS. 15A-15B, when the accessory is positioned within the case, communications coils 228 and 248 may be suitably aligned to provide sufficient magnetic coupling for the desired communications operations.

Figure 16A:
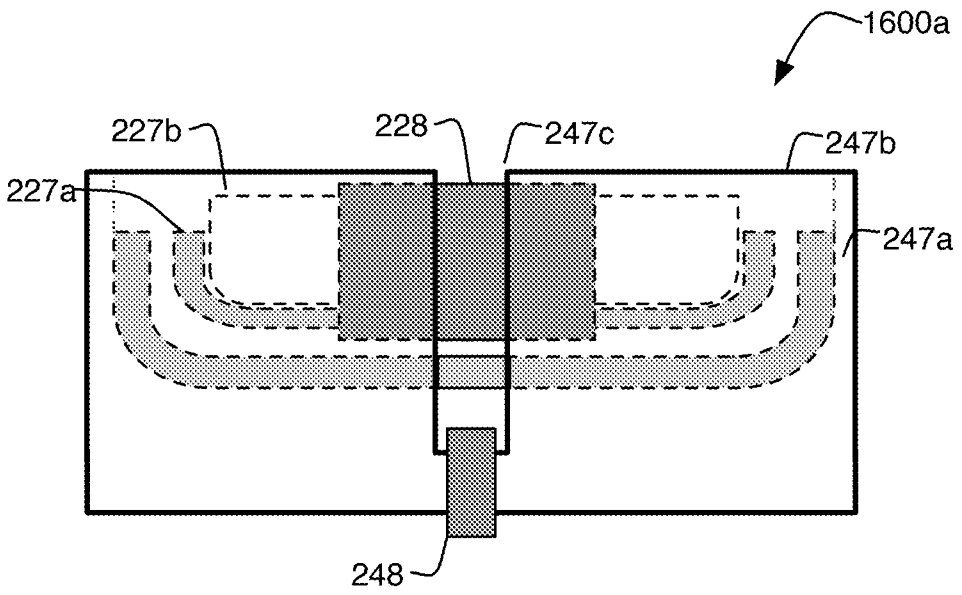
FIGS. 16A-16B illustrate a wireless power transfer system configurations including a substantially vertical transmitter communications coil and a bowtie receiver communications coil.
Figure 16B:
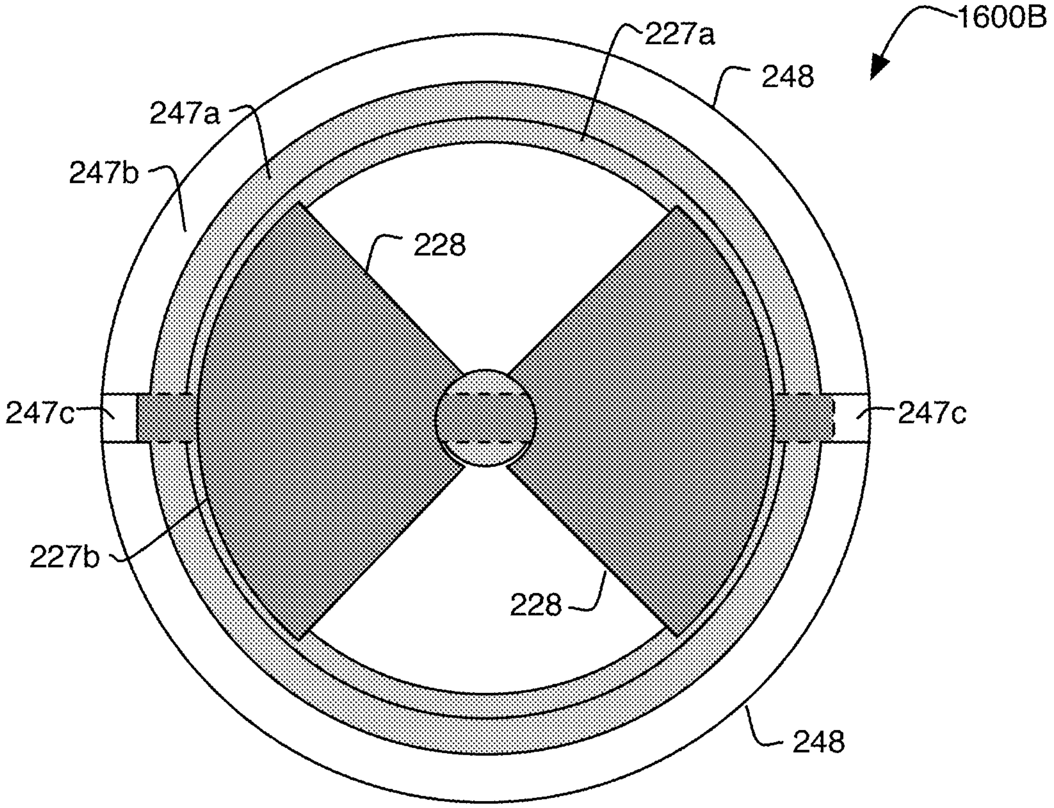

FIGS. 16A-16B illustrate an alternative configuration including a (substantially) vertical transmitter and receiver coils. More specifically, FIG. 16A includes profile view 1600*a* and FIG. 16N includes plan view 1600*b*. In this embodiment, the power coils are configured as described above with respect to the embodiment of FIGS. 14A-14B. As in that embodiment, although hemispherical power windings are described in the illustrated embodiments, it will be appreciated that substantially planar coil configurations or other three-dimensional coil configurations could also be used as desired or appropriate for a given embodiment.

The wireless accessory 202 may also include an accessory communications coil 228, which may, for example be wrapped around receiver ferrite 227*b*, also enveloping the receive power coil 227*a*. The receiver communications coil configuration illustrated in FIGS. 16A-16B is a "bow-tie" configuration wound around the receiver core 227*b* as shown. In this embodiment, each receiver communications coil winding may be wound around a sector of the receiver ferrite 227*b* and receiver power winding 227*a* and through a hole in the center of receiver ferrite 227*b*. This "bowtie" configuration still provides a net orthogonal axis (flux direction) that is in a plane parallel to the orthogonal axis (flux direction) of transmitter communications coil 248.

Likewise, magnetic charging case 204 may have disposed therein, in a complementary location, case communications coil 248, wound around a lower portion of transmitter ferrite 247*b* (taking advantage of slots 247*c*) as described above with respect to FIGS. 14A-14B. In the embodiment of FIGS. 16A-16B, the case and accessory communications coils 248 and 228 are located inside the projected circumference of the corresponding power coils 247*a* and 227*a*. In other words, the effective diameter of the communications coils is less than that of the power coils. This may be different in other embodiments described herein. This winding configuration may provide for differing flux directions as compared to the power windings, thereby providing a degree of magnetic isolation from the magnetic circuit used for power transmission from the case to the accessories, which has flux in a different direction (caused by the geometry of the power windings). As illustrated in the views of FIG. 16A-16B, when the accessory is positioned within the case, communications coils 228 and 248 may be suitably aligned to provide sufficient magnetic coupling for the desired communications operations.

The foregoing describes exemplary embodiments of wireless power transfer systems that provide for isolation between the magnetic circuits used for power transfer and the magnetic circuits used for communications. Such systems may be used in a variety of applications but may be particularly advantageous when used in conjunction with personal electronic devices such as mobile computing devices (e.g., laptop computers, tablet computers, smart phones, and the like) and their accessories (e.g., wireless earphones, styluses and other input devices, etc.) as well as wireless charging accessories (e.g., charging mats, pads, stands, etc.). Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims. Additionally, unless specifically stated otherwise herein, any and all features described with respect to one embodiment, including but not limited to winding configurations, core configurations, etc., may be combined with any other embodiment unless such combination would be physically impossible or otherwise inoperable.

The foregoing describes exemplary embodiments of wireless power transfer systems that are able to transmit certain information amongst the PTx and PRx in the system. The present disclosure contemplates this passage of information improves the devices' ability to provide wireless power signals to each other in an efficient and non-damaging manner to facilitate battery charging. It is contemplated some implementers of the present technology may consider the passage of identifiers, such as serial numbers, UIDs, manufacturer IDs, MAC addresses, or the like, to aide in the identification of PTx's and PRx's, particularly their wireless capabilities, to one another.

Entities implementing the present technology should take care to ensure that, to the extent any sensitive information is transmitted between wireless transceivers in the above-described embodiments of wireless charging systems, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system, and allow users to "opt in" or "opt out" of participation. For instance, such information may be presented to the user when they place a device onto a power transmitter.

It is the intent of the present disclosure that personal information data, if any, should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. A wireless earphone having a speaker portion insertable into a user's ear and a stem portion extending therefrom, the wireless earphone comprising:

a power receiving coil located in a distal end of the stem portion and comprising a quasi-hemispherical magnetic core and a quasi-hemispherical power winding disposed around an exterior of the quasi-hemispherical magnetic core, wherein the power receiving coil is configured to be magnetically coupled to a power transmitting coil of a wireless power transmitter;

wireless power receiving circuitry configured to receive energy from the power receiving coil;

a processor and communications module; and a wireless communications coil located in the stem portion and coupled to the processor and communications module, the wireless communications coil comprising one or more windings configured to be magnetically coupled to a Double-D communications coil of the wireless power transmitter to allow communications between the processor and communications module and the wireless power transmitter, wherein the one or more windings of the wireless communications coil are disposed in at least one plane parallel to an axis of symmetry of the Double-D communications coil.

2. The wireless earphone of claim 1 wherein the wireless communications coil envelops the power winding.

3. The wireless earphone of claim 1 wherein the wireless communications coil envelops the quasi-hemispherical magnetic core but not the power winding.

4. The wireless earphone of claim 3 wherein an effective diameter of the wireless communications coil is greater than an effective diameter of the power winding.

5. The wireless earphone of claim 1 wherein the power receiving coil is configured to be disposed within a quasi-hemispherical power transmitting coil of the wireless power transmitter.

6. The wireless earphone of claim 1 wherein the wireless communications coil shares the quasi-hemispherical magnetic core.

7. The wireless earphone of claim 1 wherein the one or more windings of the wireless communications coil are disposed in a plane that is perpendicular to the plane of the Double-D communications coil.

8. The wireless earphone of claim 1 wherein the one or more windings of the wireless communications coil are disposed in a plane that is neither perpendicular nor parallel to the plane of the Double-D communications coil.

9. The wireless earphone of claim 8 wherein the one or more windings of the wireless communications coil are disposed in two or more planes, at least one of which is neither perpendicular nor parallel to the plane of the Double-D communications coil.

10. An earphone charging case for a wireless earphone having a speaker portion insertable into a user's ear and a stem portion extending therefrom, the earphone charging case comprising:

a power transmitting coil configured to be magnetically coupled to a power receiving coil of a wireless power receiver, the power receiving coil located in a distal end of the stem portion of the wireless earphone, the power transmitting coil comprising a quasi-hemispherical shell magnetic core and a quasi-hemispherical power winding disposed around an interior of the quasi-hemispherical shell magnetic core;

wireless power transmitting circuitry configured to transmit energy via the power transmitting coil;

a case communications module and a case processing system; and a wireless communications coil coupled to the case communications module and the case processing system, the wireless communications coil comprising a Double-D winding configured to be magnetically coupled to a communications coil of the wireless power receiver, the communications coil located in the stem portion of the wireless earphone and having one or more windings parallel to an axis of symmetry of the Double-D winding to allow communications between the case communications module and the case processing system and the wireless power receiver.

11. The earphone charging case of claim 10 wherein the earphone charging case includes one or more alignment features configured to position earphones relative to the case for suitable alignment of the coils.

12. The earphone charging case of claim 10 wherein the wireless communications coil is disposed in a recess in a lower portion of the quasi-hemispherical shell magnetic core.

13. The earphone charging case of claim 12 wherein an effective diameter of the wireless communications coil is greater than an effective diameter of the power winding.

14. The earphone charging case of claim 12 wherein an effective diameter of the wireless communications coil is less than an effective diameter of the power winding.

15. The earphone charging case of claim 10 wherein the power transmitting coil is located in a portion of the case configured to receive a distal end of a stem portion of a wireless earphone.

16. The earphone charging case of claim 10 wherein the wireless communications coil shares the quasi-hemispherical shell magnetic core.

* * * * *